US006356335B1

(12) United States Patent
Kim et al.

(10) Patent No.: US 6,356,335 B1
(45) Date of Patent: Mar. 12, 2002

(54) MULTI-DOMAIN LIQUID CRYSTAL DISPLAY DEVICE

(75) Inventors: Kyeong Jin Kim, Bucheon-shi; Jang Jin Yoo, Seoul; Sung Joon Bae, Sungnam-shi, all of (KR)

(73) Assignee: LG. Phillips LCD Co., Ltd., Seoul (KR)

( * ) Notice: Subject to any disclaimer, the term of this patent is extended or adjusted under 35 U.S.C. 154(b) by 0 days.

(21) Appl. No.: 09/326,415

(22) Filed: Jun. 4, 1999

(30) Foreign Application Priority Data

Nov. 11, 1998 (KR) .............................. 98-48226

(51) Int. Cl.[7] ...................... G02F 1/1339; G02F 1/1337
(52) U.S. Cl. ........................ 349/156; 349/129; 349/138
(58) Field of Search ................................ 349/156, 155, 349/123, 122, 138, 129, 56

(56) References Cited

U.S. PATENT DOCUMENTS

| 4,333,708 A | * | 6/1982 | Boyd et al. ................. 349/122 |
| 4,581,608 A | | 4/1986 | Aftergut et al. ............. 340/704 |
| 4,653,864 A | * | 3/1987 | Baron et al. ................ 349/156 |
| 4,728,175 A | | 3/1988 | Baron ......................... 350/336 |
| 4,937,566 A | | 6/1990 | Clerc ......................... 340/784 |

(List continued on next page.)

FOREIGN PATENT DOCUMENTS

| EP | 0 613 037 | 8/1994 |
| EP | 0 635 748 | 1/1995 |
| EP | 0 636 919 | 2/1995 |
| EP | 0 752 611 | 1/1997 |
| EP | 0 814 142 | 12/1997 |

(List continued on next page.)

OTHER PUBLICATIONS

A. Lien, et al., Two–Domain TN–LCDs Fabricated by Parallel Fringe Field Method, SID 93 Digest, pp. 269–272.
A. Lien, et al., TFT–Addressed Two–Domain TN VGA Displays Fabricated Using the Parallel–Fringe–Field Method, SID 94 Digest, pp. 594–597.
N. Koma, et al., No–Rub Multi–Domain TFT–LCD Using Surrounding–Electrode Method, SID 95 Digest, pp. 869–872.
H. Murai, et al., Novel high contrast random and controlled 4–domain CTN–LCDs with wide viewing angle, Euro Display '96, pp. 159–161.
Y. Koike, et al., A Vertically Aligned LCD Providing Super–High Image Quality, IDW '97, pp. 159–162.
N. Koma, et al., Development of a High–Quality TFT–LCD for Projection Displays, SID 97 Digest, pp. 461–464.
K. Ohmuro, et al., Development of Super–High–Image–Quality Vertical–Alignment–Mode LCD, SID 97 Digest, pp. 845–848.
A. Lien, R.A. John, Two–Domain TN–LCDs Fabricated by Parallel Fringe Field Method, SID Digest, 1993, pp. 269–272.

(List continued on next page.)

Primary Examiner—Kenneth Parker
(74) Attorney, Agent, or Firm—Long Aldridge & Norman LLP

(57) ABSTRACT

A multi-domain liquid crystal display device comprises first and second substrates facing each other and a liquid crystal layer between the first and second substrates. A plurality of gate bus lines are arranged in a first direction on the first substrate and a plurality of data bus lines are arranged in a second direction on the first substrate to define a pixel region. A pixel electrode electrically is charged through the data bus line in the pixel region, a color filter layer is formed on the second substrate, and a common electrode is formed on the color filter layer. Dielectric frames are formed in the pixel region, and an alignment layer on at least one substrate between the first and second substrates.

49 Claims, 35 Drawing Sheets

U.S. PATENT DOCUMENTS

| | | | |
|---|---|---|---|
| 4,978,203 A | | 12/1990 | Yamazaki et al. ...... 350/339 R |
| 4,999,619 A | * | 3/1991 | Te Velde ................... 349/156 |
| 5,249,070 A | | 9/1993 | Takano |
| 5,309,264 A | | 5/1994 | Lien et al. ..................... 359/87 |
| 5,559,621 A | * | 9/1996 | Minato et al. .............. 349/156 |
| 5,574,582 A | | 11/1996 | Takeda et al. ................. 359/59 |
| 5,579,141 A | | 11/1996 | Suzuki et al. |
| 5,623,354 A | | 4/1997 | Lien et al. |
| 5,627,667 A | | 5/1997 | Mizushima et al. |
| 5,657,102 A | | 8/1997 | Mizushima et al. |
| 5,666,178 A | | 9/1997 | Hirata et al. |
| 5,668,650 A | | 9/1997 | Mori et al. ................... 349/42 |
| 5,691,792 A | | 11/1997 | Mizushima et al. |
| 5,719,652 A | * | 2/1998 | Hayashi et al. ............. 349/122 |
| 5,719,653 A | * | 2/1998 | Minato et al. ................ 349/156 |
| 5,737,051 A | | 4/1998 | Kondo et al. ............... 349/141 |
| 5,777,701 A | | 7/1998 | Zhang ........................ 349/44 |
| 5,831,704 A | * | 11/1998 | Yamada et al. ............. 349/124 |
| 5,852,486 A | * | 12/1998 | Hoke, Jr. .................... 349/156 |
| 5,929,960 A | * | 7/1999 | West et al. ................. 349/156 |
| 5,940,157 A | * | 8/1999 | Nakamura et al. .......... 349/156 |
| 5,978,062 A | * | 11/1999 | Liang et al. ................. 349/155 |
| 5,978,064 A | * | 11/1999 | Nishiguchi .................. 349/156 |
| 6,013,335 A | | 1/2000 | Hirata et al. |
| 6,115,098 A | * | 9/2000 | Kume et al. ................ 349/156 |
| 6,118,510 A | * | 9/2000 | Bradshaw et al. .......... 349/156 |
| 6,184,961 B1 | * | 2/2001 | Ham .......................... 349/141 |

FOREIGN PATENT DOCUMENTS

| | | |
|---|---|---|
| EP | 0 854 377 | 7/1998 |
| EP | 0 884 626 | 12/1998 |
| EP | 0 977 078 | 2/2000 |
| GB | 2 296 810 | 7/1996 |
| GB | 2 321 718 | 8/1998 |
| GB | 2 337 843 | 1/1999 |
| JP | 05-297412 | 11/1993 |
| JP | 07-14701 | 1/1995 |
| JP | 09-197420 | 7/1997 |
| JP | 09-230387 | 9/1997 |
| KR | 1994-0004297 | 5/1994 |
| KR | 10-0211605 | 5/1999 |
| WO | WO 96/10774 | 4/1996 |
| WO | 961 0774 | 4/1996 |
| WO | WO 00/08521 | 2/2000 |

OTHER PUBLICATIONS

A. Lien, R.A. John, TFT–Addressed Two–Domain TN VGA Displays Fabricated Using the Parallel Fringe Field Method, SID Digest, 1994, pp. 594–597.

N. Koma, Y. Baba, K. Matsuoka, No–Rub Multi–Domain TFT–LCD Using Surrounding–Electrode Method, SID Digest, 1995, pp. 869–872.

H. Murai, M. Suzuki, S. Kaneko, Novel High Contrast Random and Controlled 4–Domain CTN–LCDs with Wide Viewing Angle, Euro Display '96, pp. 159–161.

Y. Koike, S. Kataoka, T. Sasaki, H. Chida, H. Tsuda, A. Takeda and K. Ohmura, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest, 1997, pp. 845–848.

* cited by examiner

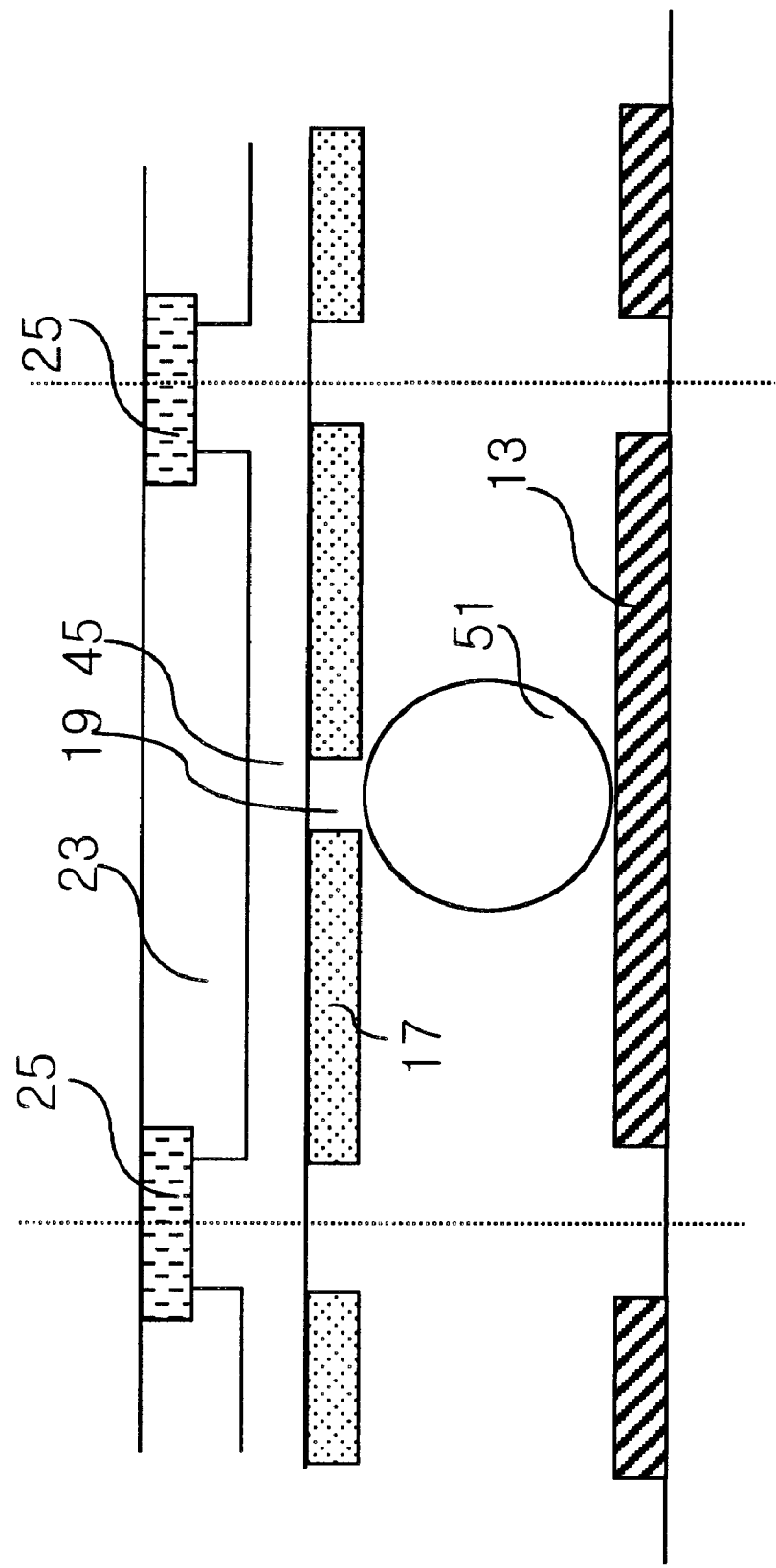

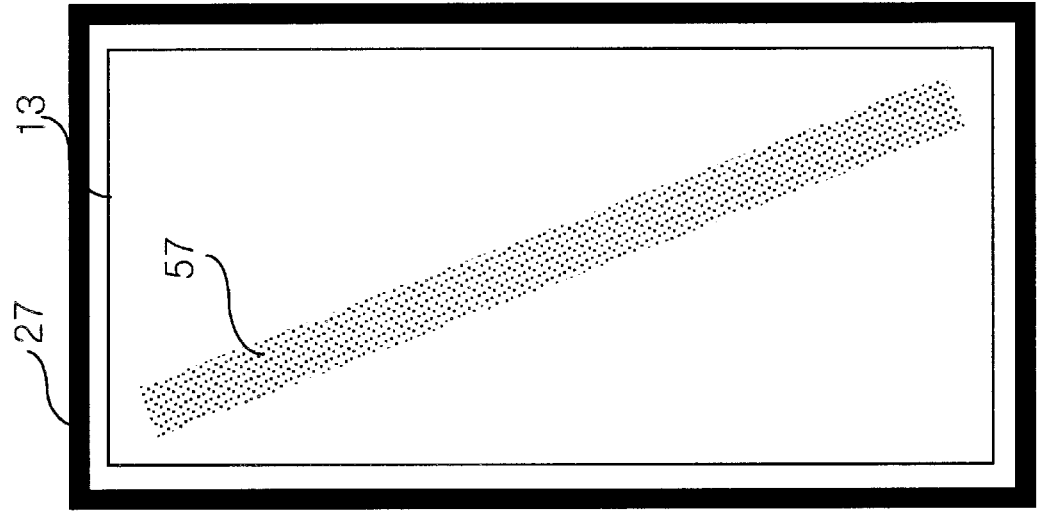
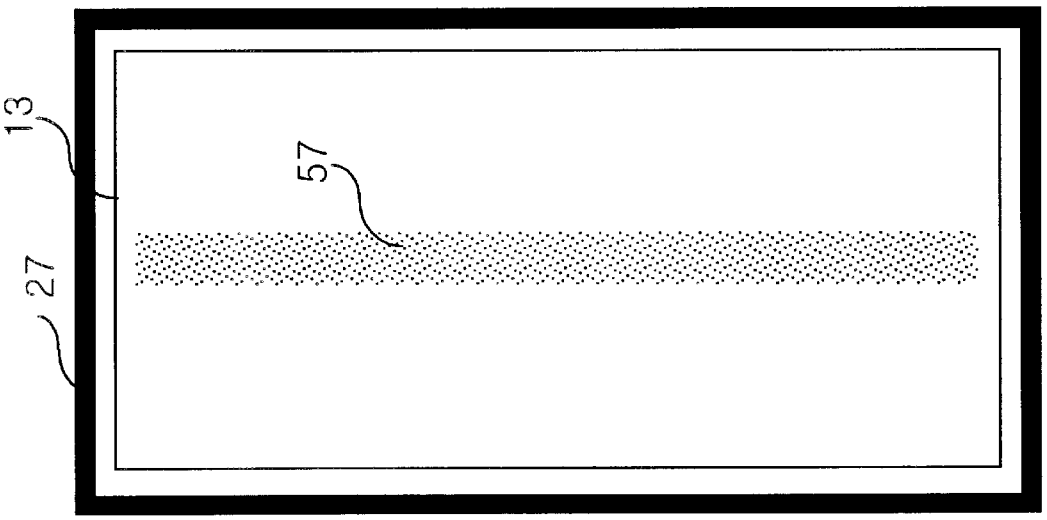

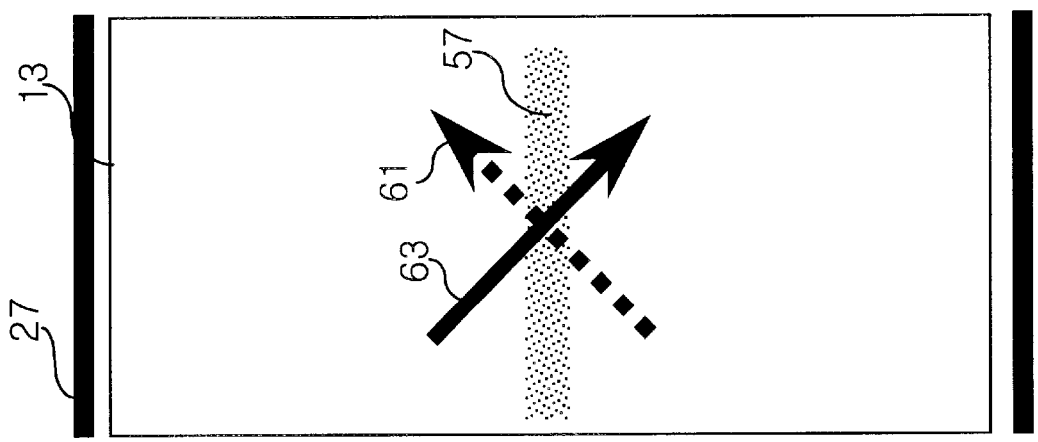
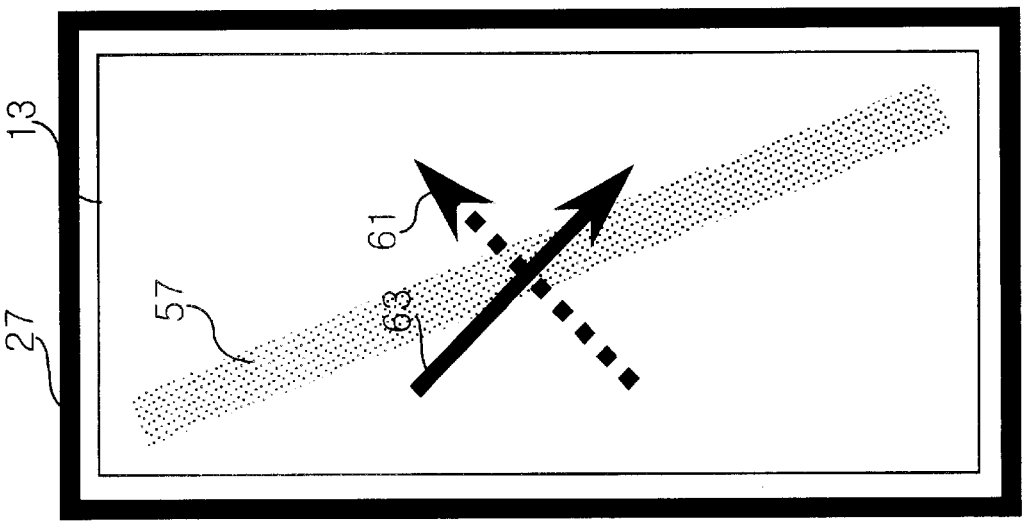
FIG. 9A

FIG. 9B
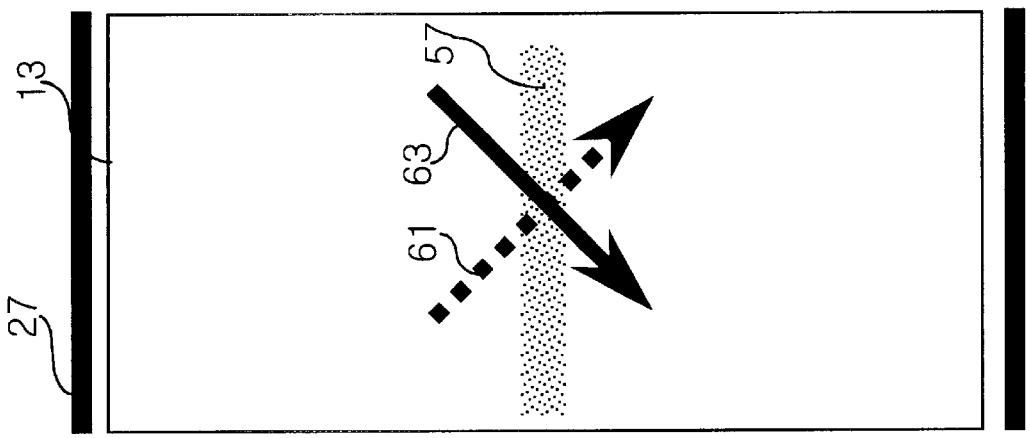
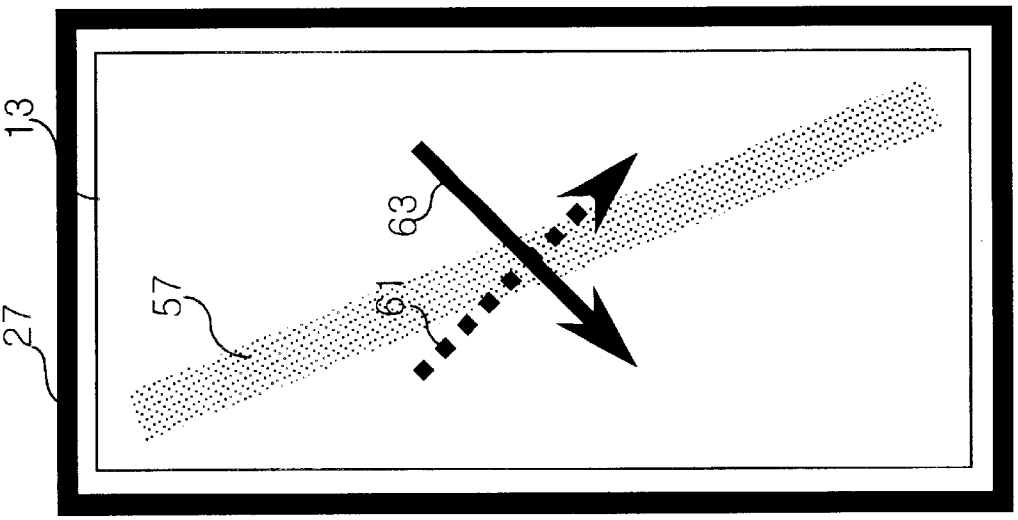

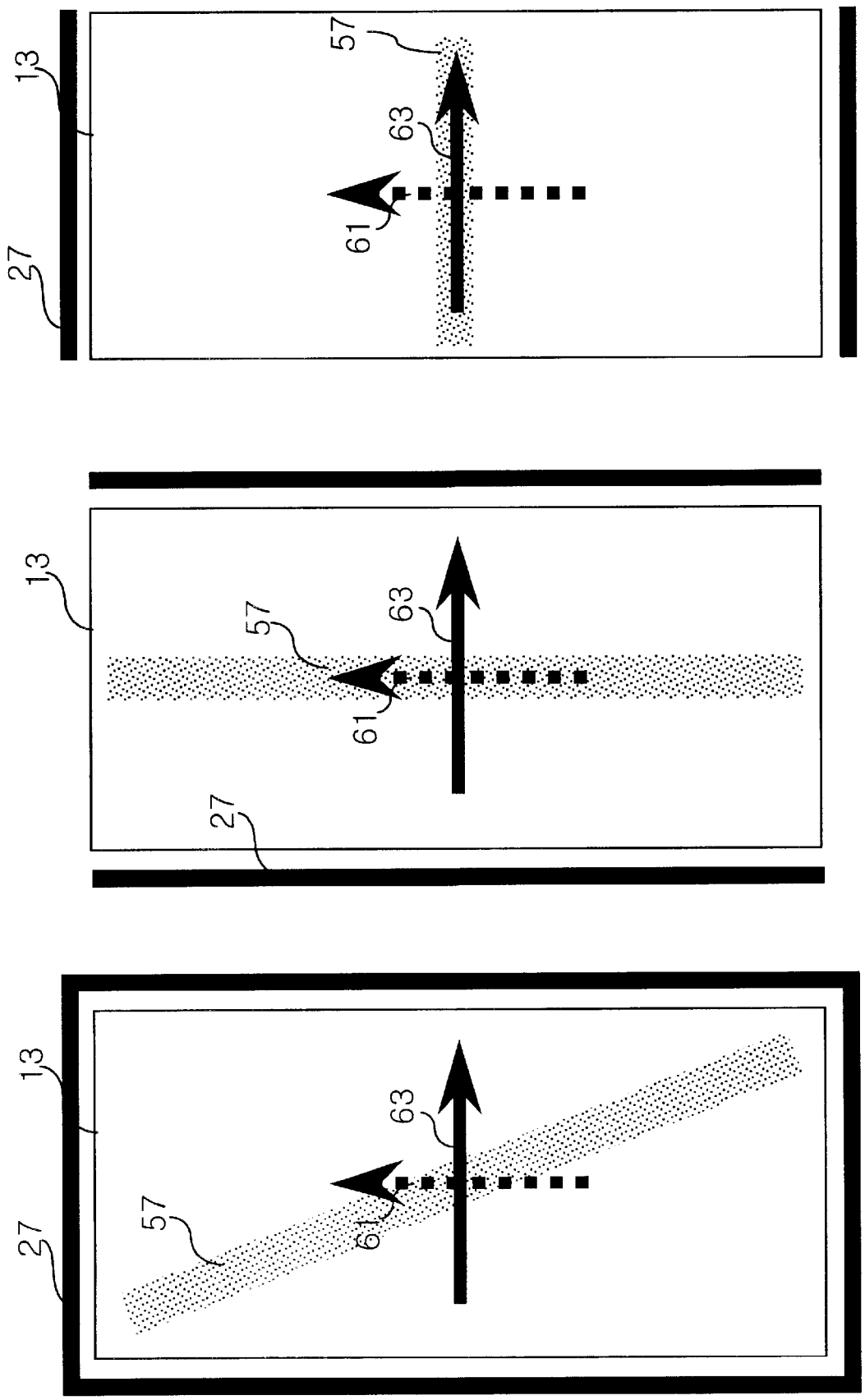

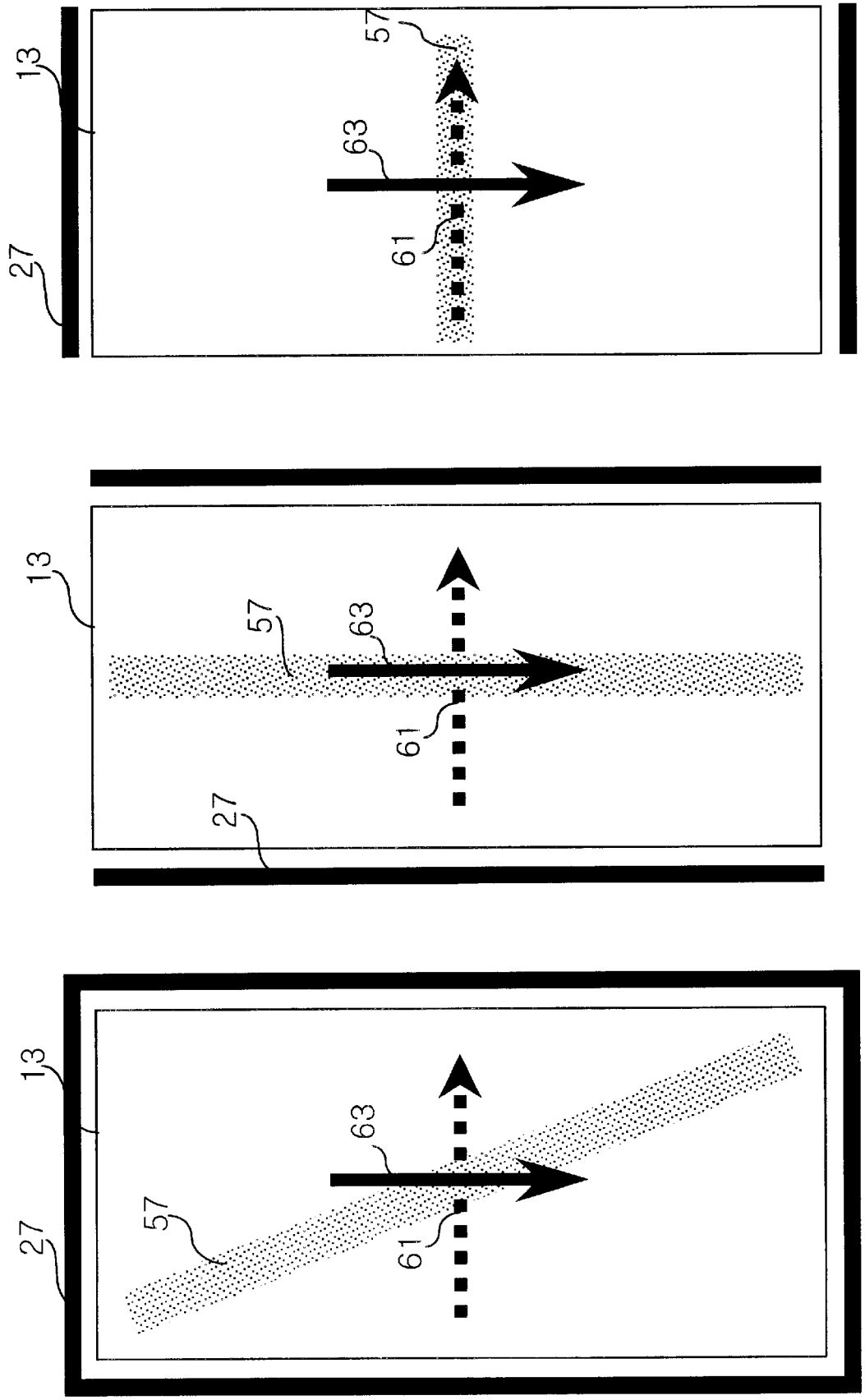

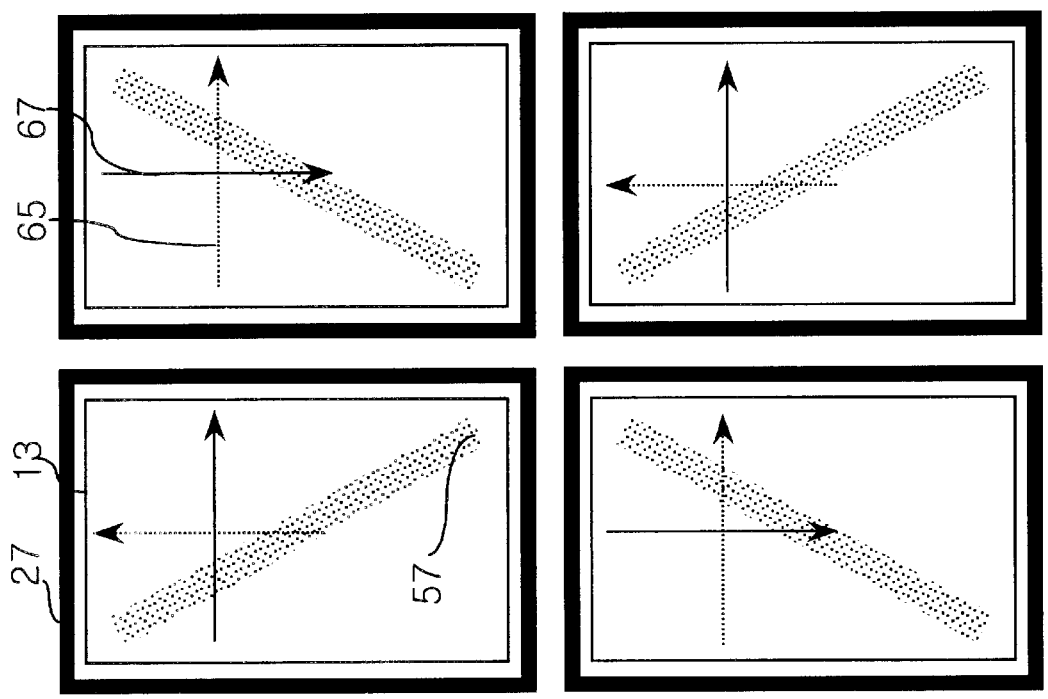

MULTI-DOMAIN LIQUID CRYSTAL DISPLAY DEVICE

BACKGROUND OF THE INVENTION

1. Field of the Invention

The present invention relates to a liquid crystal display device (LCD), and more particularly, to a liquid crystal display device having dielectric frames of which dielectric constant is different from that of liquid crystal

2. Description of the Related Art

Recently, a LCD has been proposed where the liquid crystal is not aligned, and the liquid crystal is driven by common electrode 17 having open areas 19. FIG. 1 is sectional view of pixel unit of the conventional LCD.

Regarding conventional LCDs, a plurality of gate bus lines arranged in a first direction on a first substrate and a plurality of data bus lines arranged in a second direction on the first substrate divide the first substrate into a plurality of pixel regions.

A thin film transistor (TFT) applies image signal delivered from the data bus line to a pixel electrode 13 or a passivation layer. The TFT is formed on each pixel region and comprises a gate, electrode, a gate insulator, a semiconductor layer, an ohmic contact layer, a source electrode, and a drain electrode, etc.

Alternatively, a passivation layer is formed over the whole first substrate, and pixel electrode 13 is connected to the drain electrode thereon.

On a second substrate, a light shielding layer 25 is formed to shield any light leakage from gate and data bus lines, and the TFT, a color filter layer 23 is formed on the light shielding layer, an over coat layer 45 is formed on the color filter layer, a common electrode 17 is formed to have open area 19 on the over coat layer, spacers 51 are dispersed to maintain the gap between the first and second substrates thereon, and a liquid crystal layer is formed between the first and second substrates.

Pixel electrode 13 and open area (slit) 19 of the common electrode 17 distort the electric field applied to the liquid crystal layer Then, liquid crystal molecules are driven variously in a unit pixel. This means that when voltage is applied to the LCD, dielectric energy due to the distorted electric field arranges the liquid crystal directors in needed or desired positions.

In the LCDs, however, open area 19 in common electrode 17 or pixel electrode 13 is necessary, and the liquid crystal molecules could be driven stably when the open area is wider.

If the electrodes do not have an open area or the width of the open area is narrow, the electric field distortion needed to divide the pixel region becomes weak.

And, distillation occurs from the area where the liquid crystal directors are parallel with a transmittance axis of the polarizer, which results in a decrease in brightness. Further, according to the surface state of LCDs, the liquid crystal texture has an irregular structure.

Moreover, because spacer 51 is not fixed and is mobile, there is problem that the distribution of the spacers is not uniform in the LC cell.

SUMMARY OF THE INVENTION

Accordingly, the present invention is directed to an LCD that substantially obviates one or more problems due to limitations and disadvantages of the related art.

An object of the present invention is to provide a multi-domain LCD having wide viewing angle by multi-domain and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other, a liquid crystal layer between the first and second substrates, a plurality of gate bus lines arranged in a first direction on the first substrate and a plurality of data bus lines arranged in a second direction on the first substrate to define a pixel region, a pixel electrode electrically charged through the data bus line in the pixel region, a color filter layer on the second substrate, a common electrode on the color filter Layer, dielectric frames in the pixel region, and an alignment layer on at least one substrate between the first and second substrates.

The dielectric frame is patterned, and dielectric constant of the dielectric frame is lower than dielectric constant of the liquid crystal layer.

The dielectric frame includes photosensitive materials, preferably includes a material selected from the group consisting of photoacrylate and BCB (BenzoCycloButene).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the Drawings:

FIG. 1 is a sectional view of the liquid crystal display device in the related art;

FIGS. 7A, 7B, 7C, 7D, 7E, 7F, and 7G are plan views of the multi-domain liquid crystal display devices according to embodiments of the present invention;

FIGS. 9A, 9B, 9C, and 9D are plan views of the multi-domain liquid crystal display devices according to embodiments of the present invention;

FIGS. 11A, 11B, and 11C are plan views of the multi-domain liquid crystal display devices according to embodiments of the present invention.

DETAILED DESCRIPTION OF THE PREFERRED EMBODIMENTS

Hereinafter, the multi-domain liquid crystal display device of the present invention is explained in detail by accompanying the drawings.

Figure 2A:
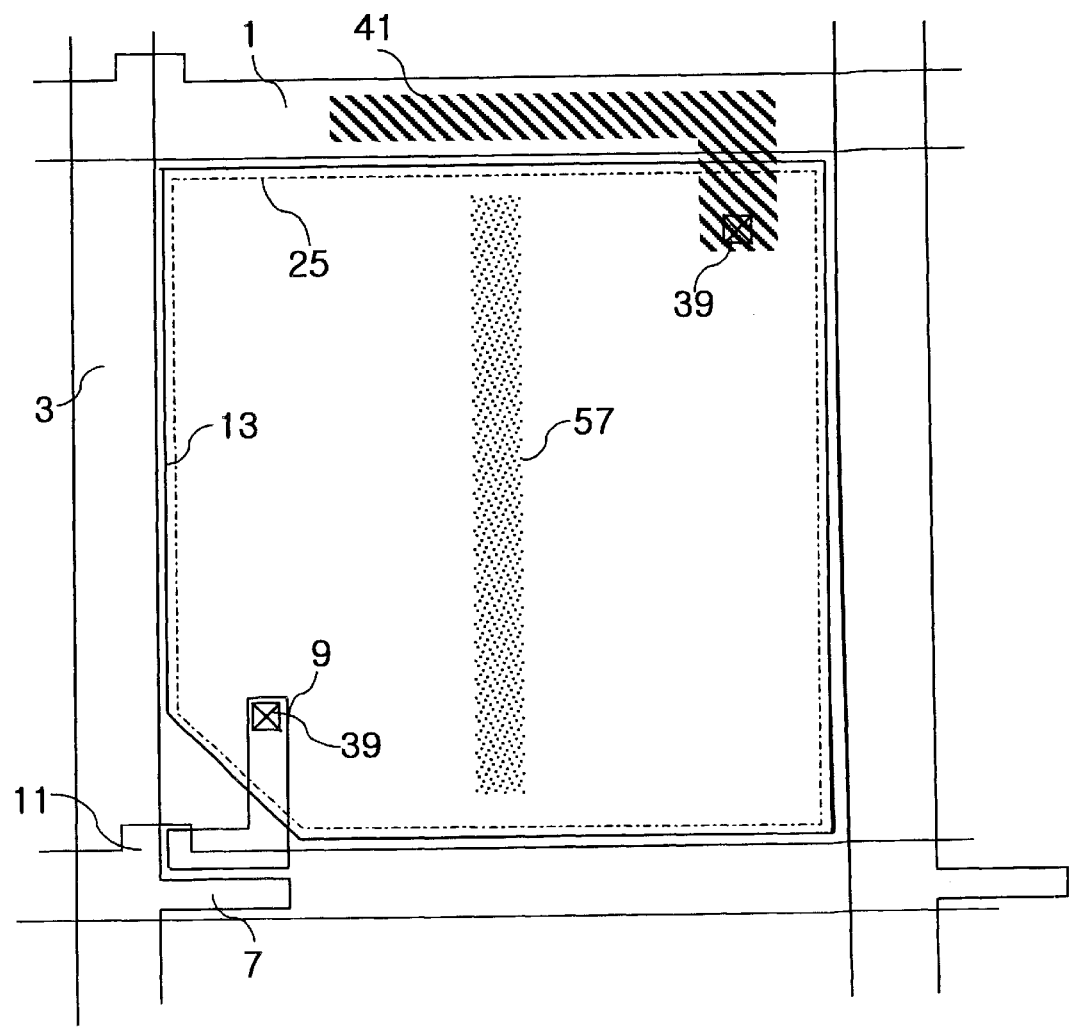
FIGS. 2A and 2B are plan and sectional view of the multi-domain liquid crystal display device according to the first embodiment of the present invention.
Figure 2B:
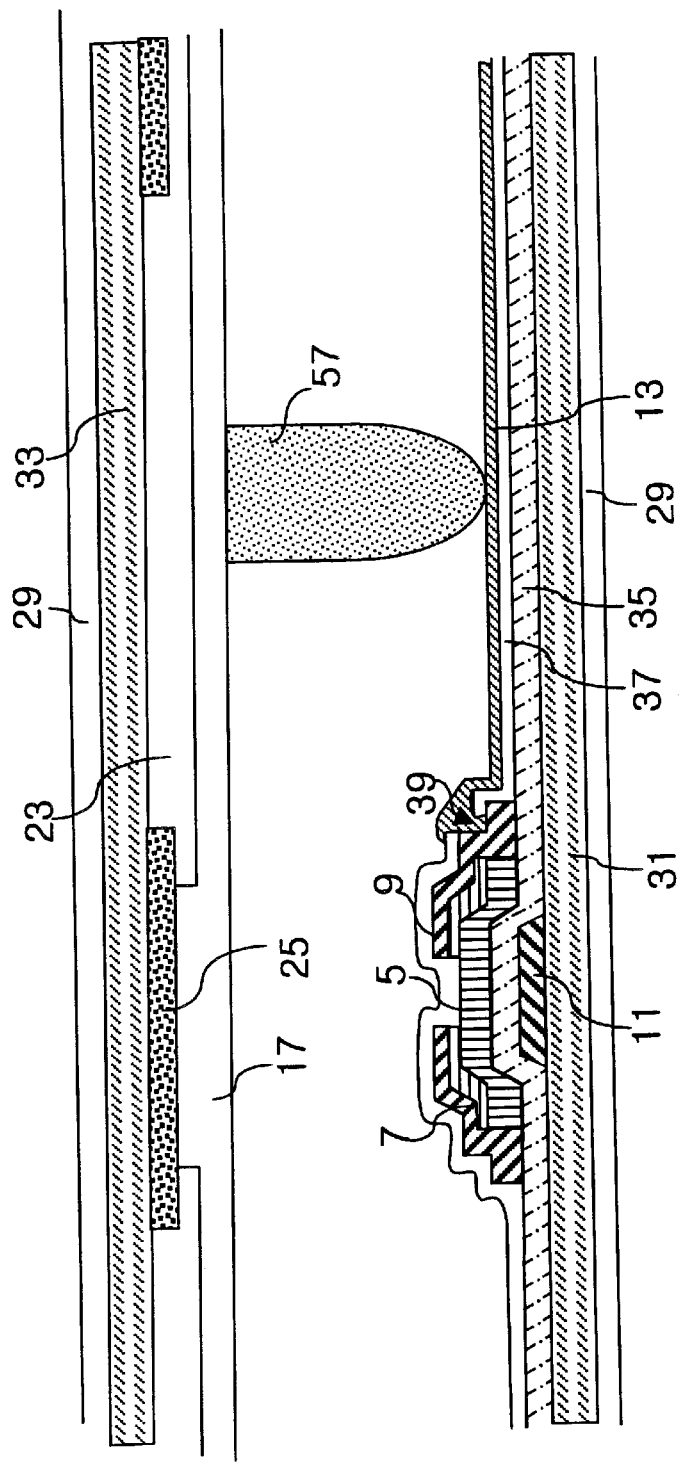
Figure 3A:
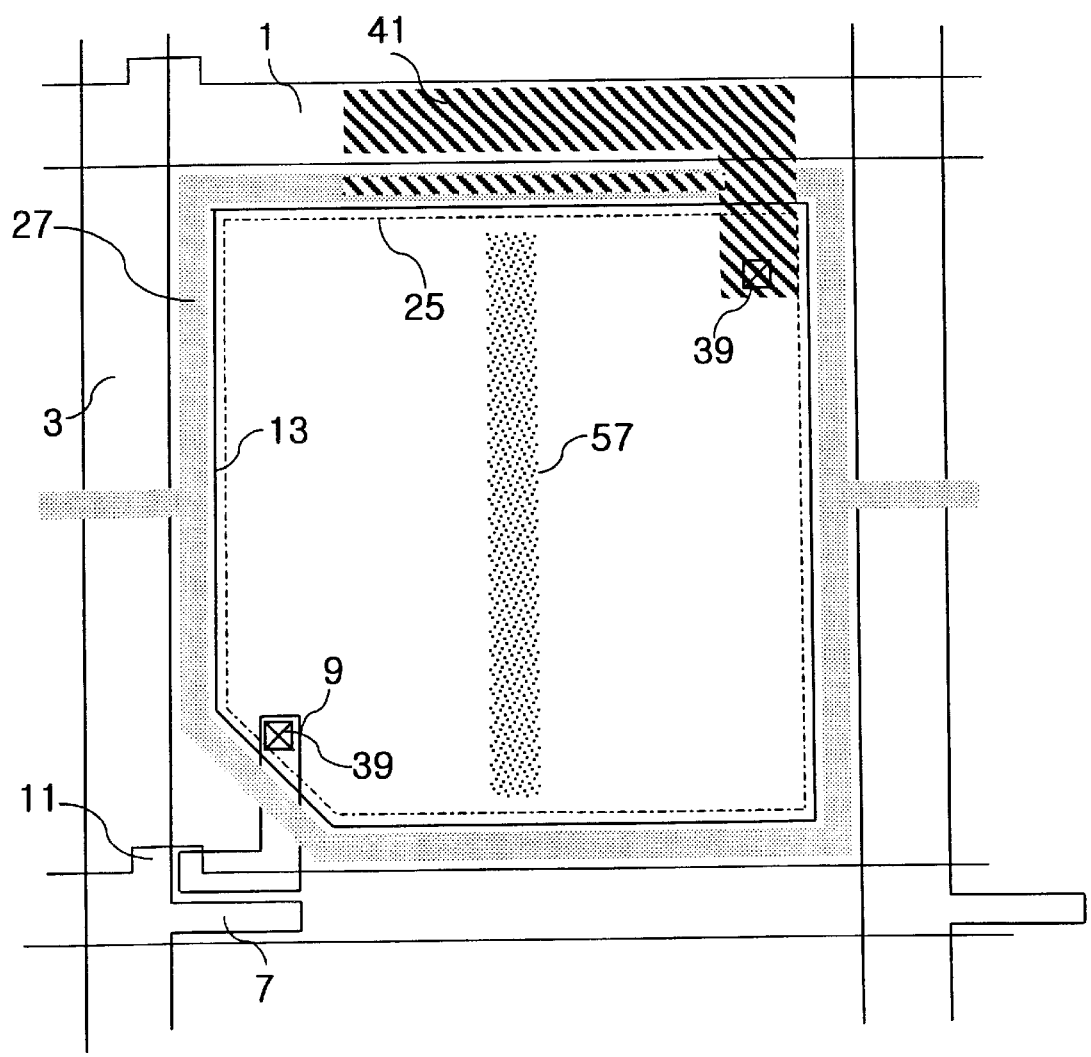
FIGS. 3A and 3B, 3C are plan and sectional views of the multi-domain liquid crystal display devices according to the second embodiment of the present invention.
Figure 3B:
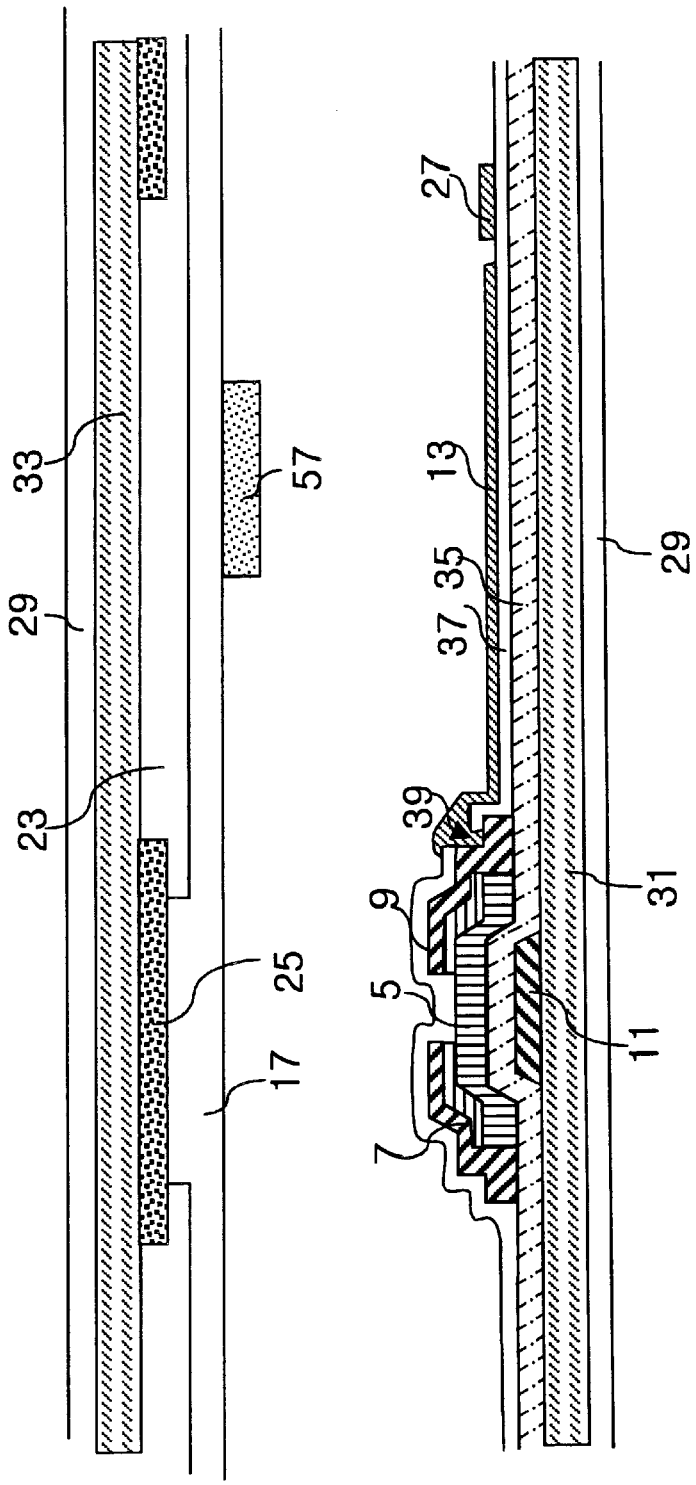
Figure 3C:
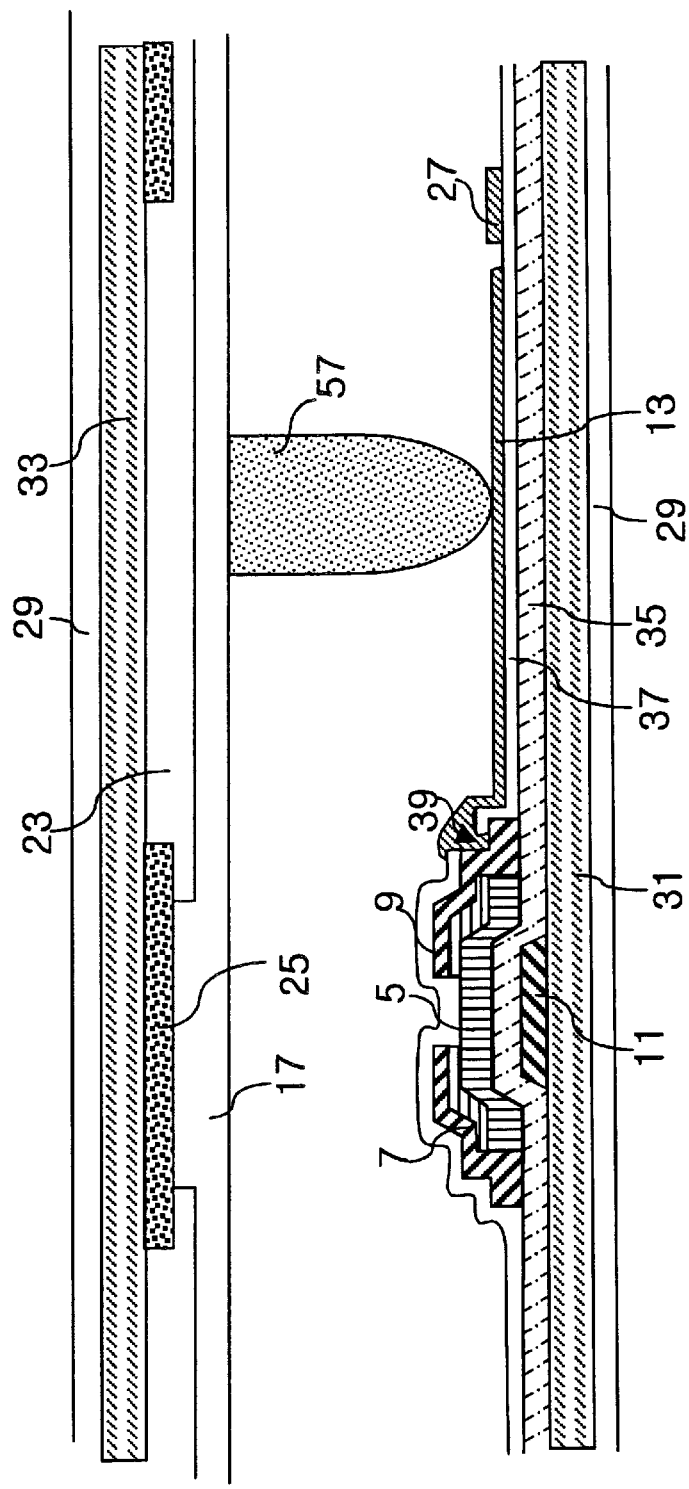
Figure 4A:
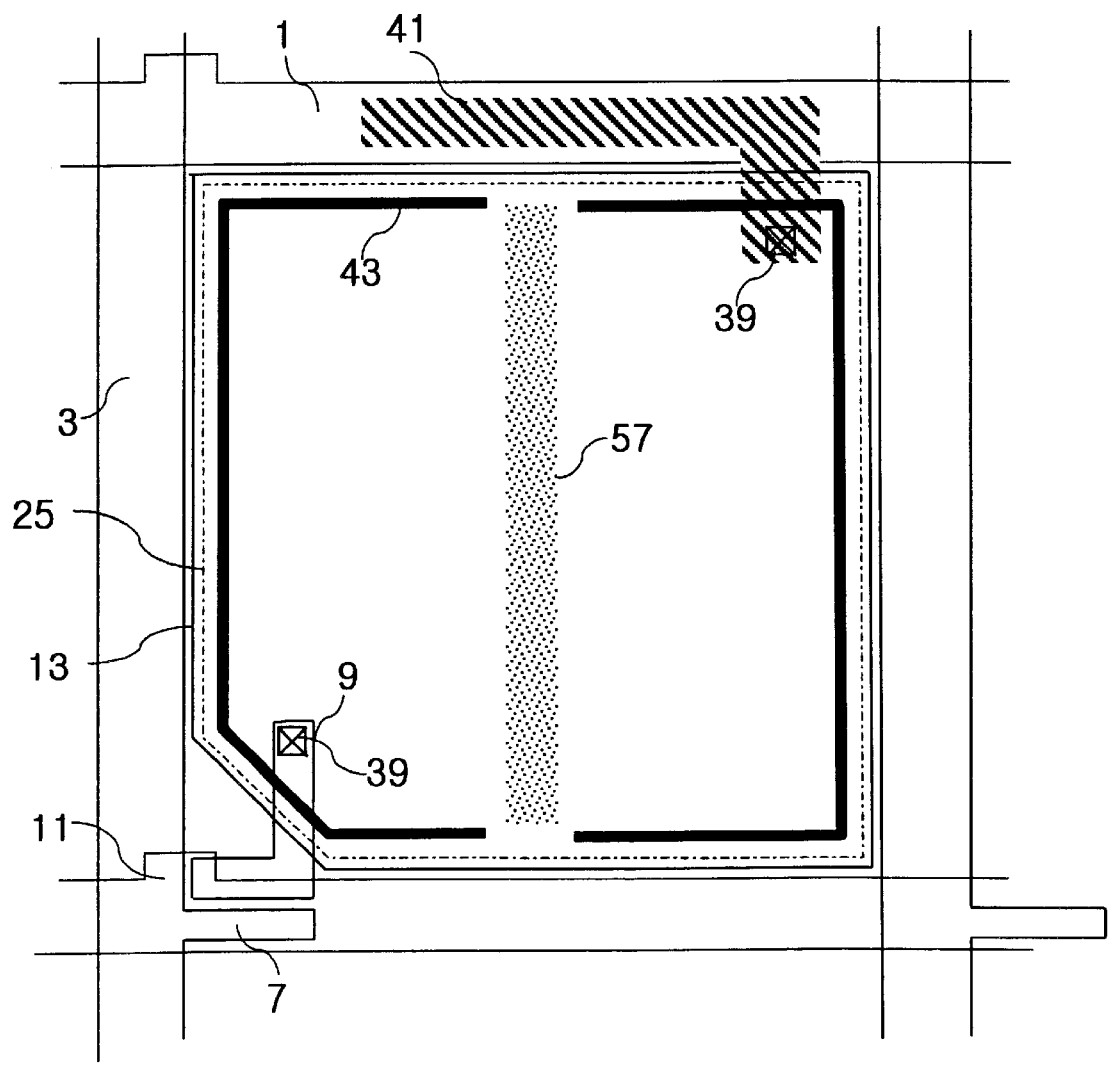
FIGS. 4A and 4B, 4C are plan and sectional views of the multi-domain liquid crystal display devices according to the third embodiment of the present invention.
Figure 4B:
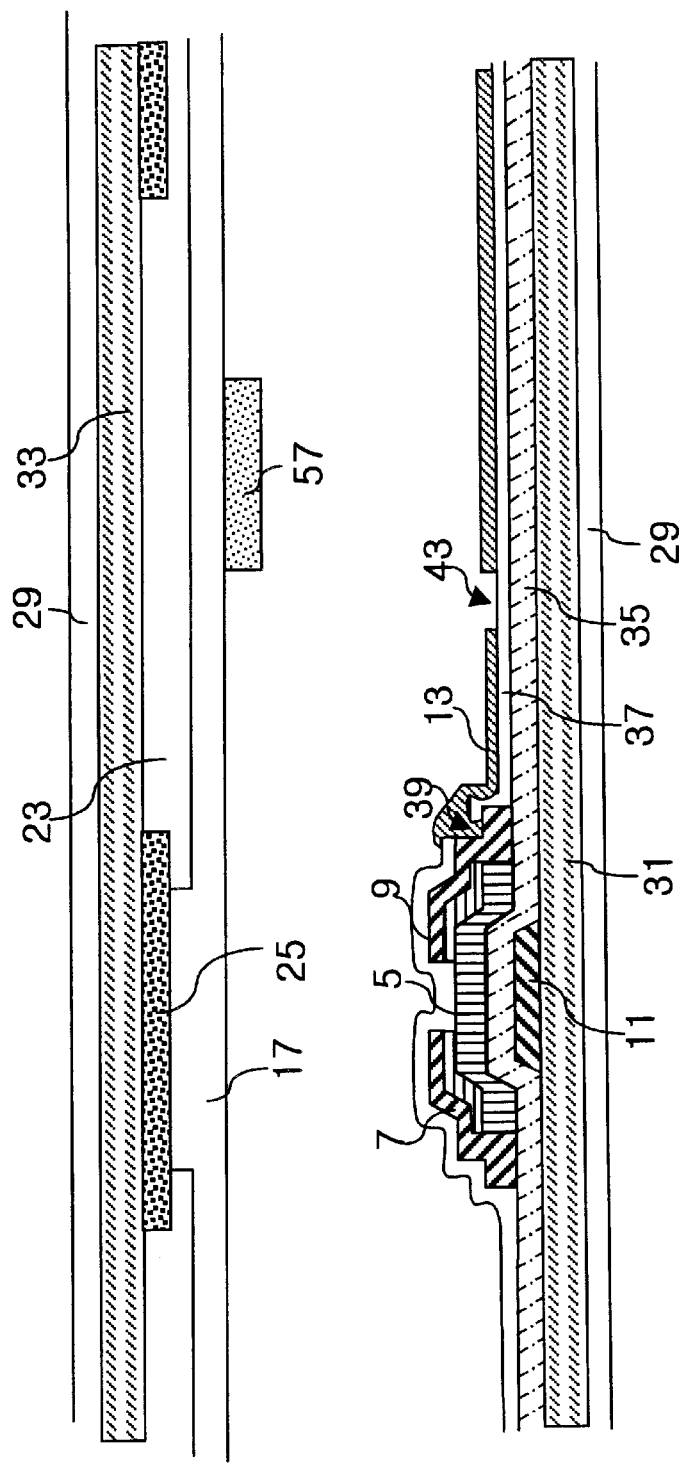
Figure 4C:
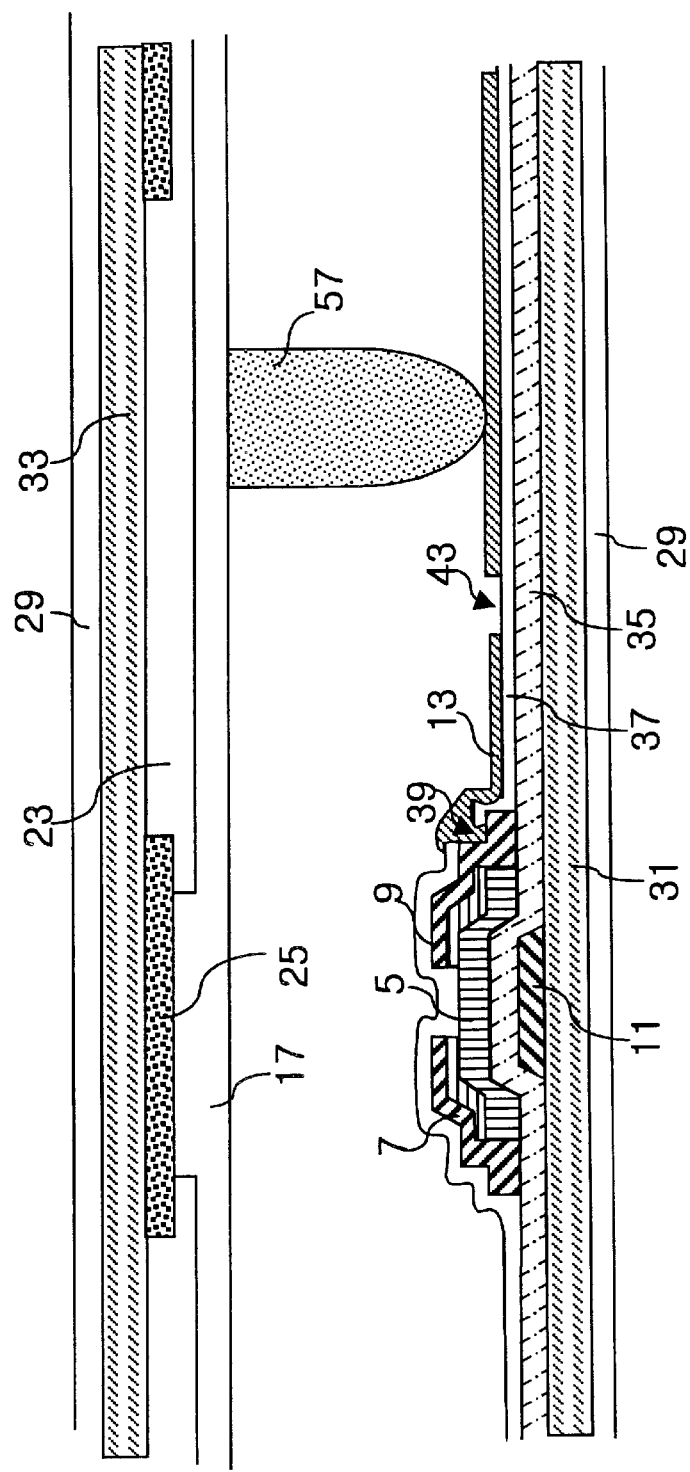

FIGS. 2A and 2B are plan and sectional view of the multi-domain liquid crystal display device according to the first embodiment of the present invention, FIGS. 3A, and 3B, 3C are plan and sectional views of the multi-domain liquid crystal display devices according to the second embodiment of the present invention, FIGS. 4A and 4B, 4C are plan and sectional views of the multi-domain liquid crystal display devices according to the third embodiment of the present invention, and FIGS. 5A and 5B, 5C, 5D, 5E, 5F, 5G are plan and sectional views of the multi-domain liquid crystal display devices according to fourth embodiment of the present invention.

As shown in the figures, the present invention comprises first and second substrates 31, 33, a plurality of gate bus lines arranged in a first direction on the first substrate and a plurality of data bus lines arranged in a second direction on the first substrate, a TFT, a passivation layer 37 on the whole first substrate 31, a pixel electrode 13, and a first alignment layer 53 on the whole first substrate.

On a second substrate, a light shielding layer 25 is formed to shield any light leakage from gate and data bus lines, and the TFT, a color filter layer 23 is formed on the light shielding layer, a common electrode 17 is formed on the color filter Layer, a dielectric frame 57 to distort electric field on the common electrode 17, a second alignment layer 55 or the whole second substrate, and a liquid crystal layer is formed between the first and second substrates.

Data bus lines and gate bus lines divide the first substrate 31 into a plurality of pixel regions. The TFT is formed on each pixel region and comprises a gate electrode 11, a gate insulator 35, a semiconductor layer 5, an ohmic contact layer, and source/drain electrodes 7, 9. Passivation layer 37 is formed on the whole first substrate and pixel electrode 13 is coupled to drain electrode 9.

To manufacture the multi-domain LCD of the present invention, in each pixel region on the first substrate 31, a TFT is formed comprising gate electrode 11, gate insulator 35, semiconductor layer 5, ohmic contact layer and source/drain electrodes 7, 9. At this time, a plurality of gate bus lines and a plurality of data bus lines are formed to divide the first substrate 31 into a plurality of pixel regions.

Gate electrode 11 and gate bus line are formed by sputtering and patterning a metal such as Al, Mo, Cr, Ta, Al alloy, etc. The gate insulator 35 is formed by depositing $SiN_x$ or $SiO_x$ using PECVD (Plasma Enhancement Chemical Vapor Deposition) thereon. Semiconductor layer 5 and the ohmic contact layer are formed by depositing with PECVD and patterning amorphous silicon (a—Si) and doped amorphous silicon ($n^+$ a—Si), respectively. Also, the gate insulator 35, semiconductor layer 5, and the ohmic contact layer are formed by PECVD and patterned. Data bus line and source/drain electrodes 7, 9 are formed by sputtering and patterning a metal such as Al, Mo, Cr, Ta, Al alloy, etc.

A storage electrode (not shown in the figures) is formed to overlap gate bus line and to connect to the pixel electrode 13 at the same time, the storage electrode makes a storage capacitor with the gate bus line.

Subsequently, passivation layer 37 is formed with BCB (BenzoCycloButene), acrylic resin, polyimide based material, $SiN_x$ or $SiO_x$ on the whole first substrate 31. Pixel electrode 13 is formed by sputtering and patterning a metal such as ITO(indium tin oxide). A contact hole 39 is formed to connect the pixel electrode 13 to the drain and storage electrodes by opening and patterning a part of the passivation layer 37 on drain electrode 9.

On the second substrate 33, a light shielding layer 25 is formed to shield any light leakage from gate and data bus lines, and the TFT. A color filter layer 23 is formed R, G, B (red, green, blue) elements to alternate on the light shielding layer. A common electrode 17 is formed with ITO on the color filter layer. A dielectric frame 57 is formed by depositing photosensitive material on the common electrode 17 or pixel electrode 13 and patterning in various shapes using photolithography. And, a liquid crystal layer is formed by injecting liquid crystal between the first and second substrates.

The dielectric frame 57 includes material of which dielectric constant is same or smaller than that of the liquid crystal, and the dielectric constant thereof is preferably below 3, for example, photoacrylate or BCB (BenzoCycloButene)

Furthermore, the dielectric frame 57 is also used as a spacer (refer to FIGS. 2B, 3C, 4C, 5C, 5E, and 5G). Dielectric frame 57 is formed on at least one substrate between the first and second substrates. In these embodiments, a spacer dispersing process could be omitted and the gap uniformity of liquid crystal cell is enhanced, therefore, the yield is improved.

Figure 5A:
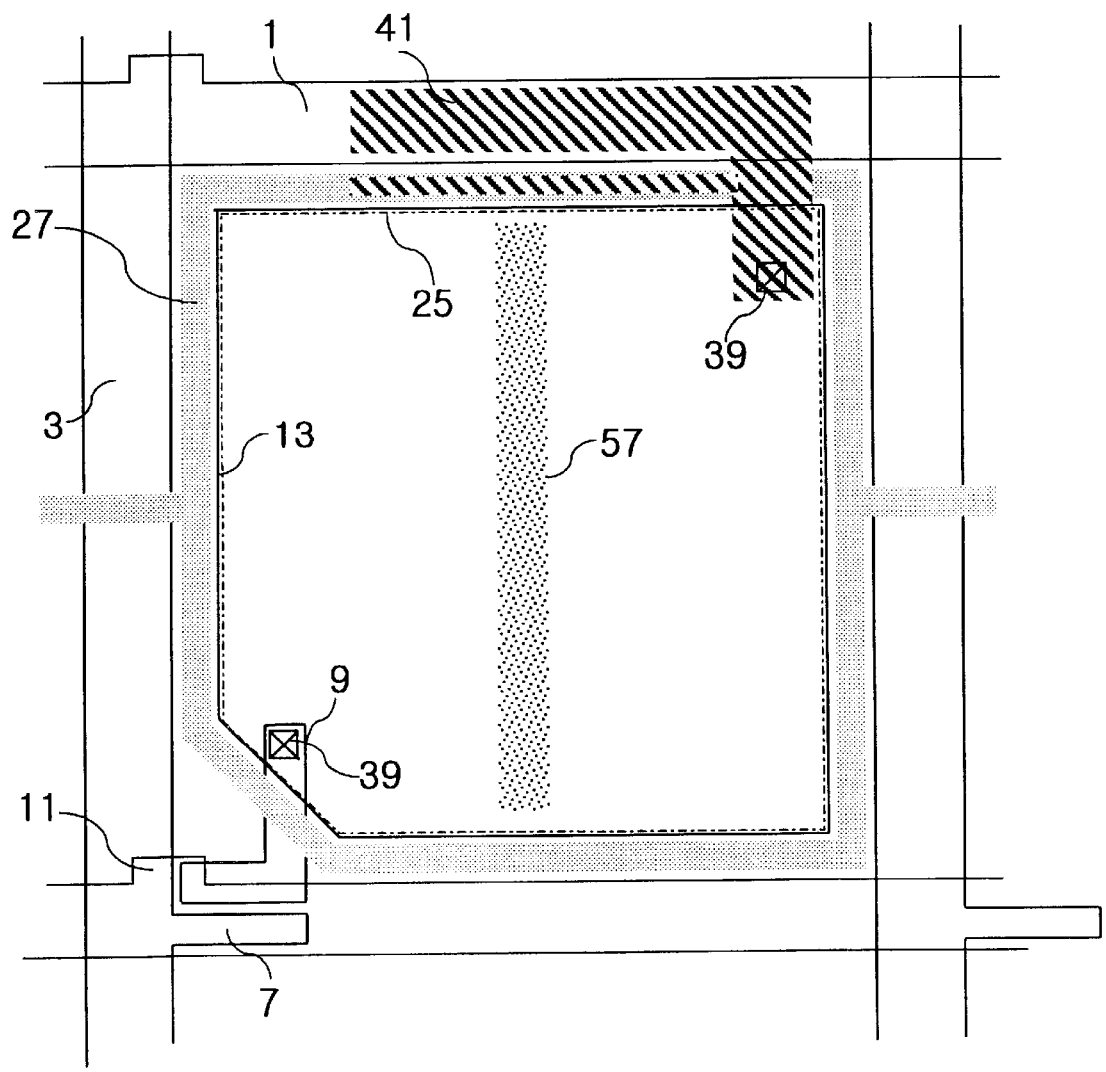
FIGS. 5A and 5B, 5C, 5D, 5E, 5F, 5G are plan and sectional views of the multi-domain liquid crystal display devices according to fourth embodiment of the present invention.
Figure 5B:
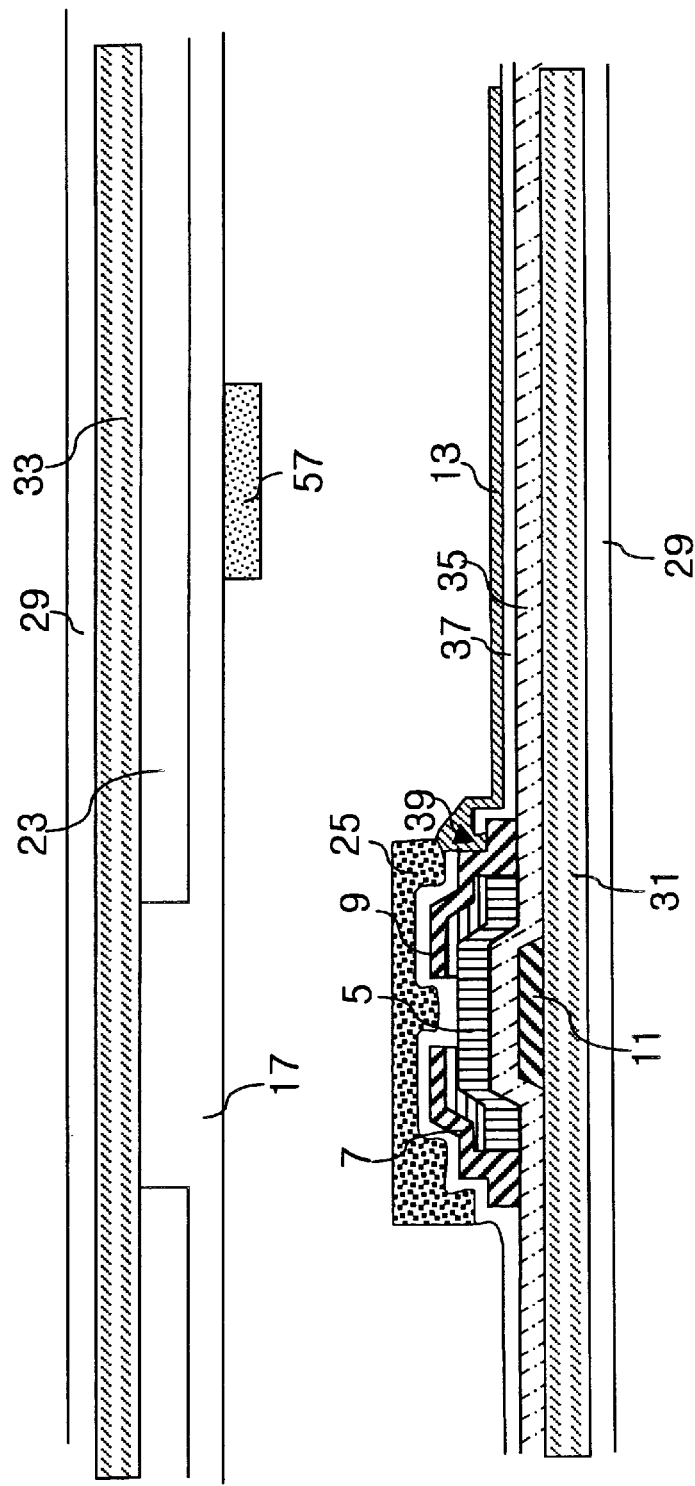
Figure 5C:
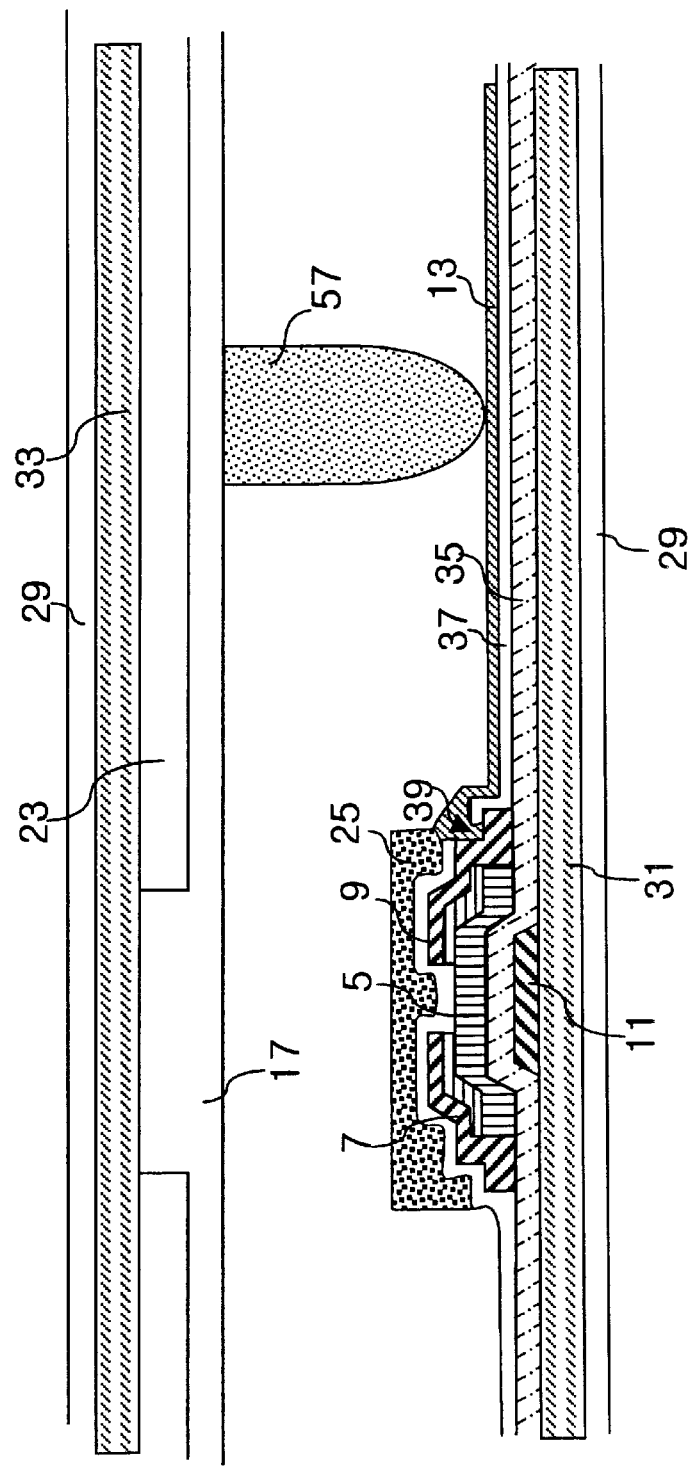
Figure 5D:
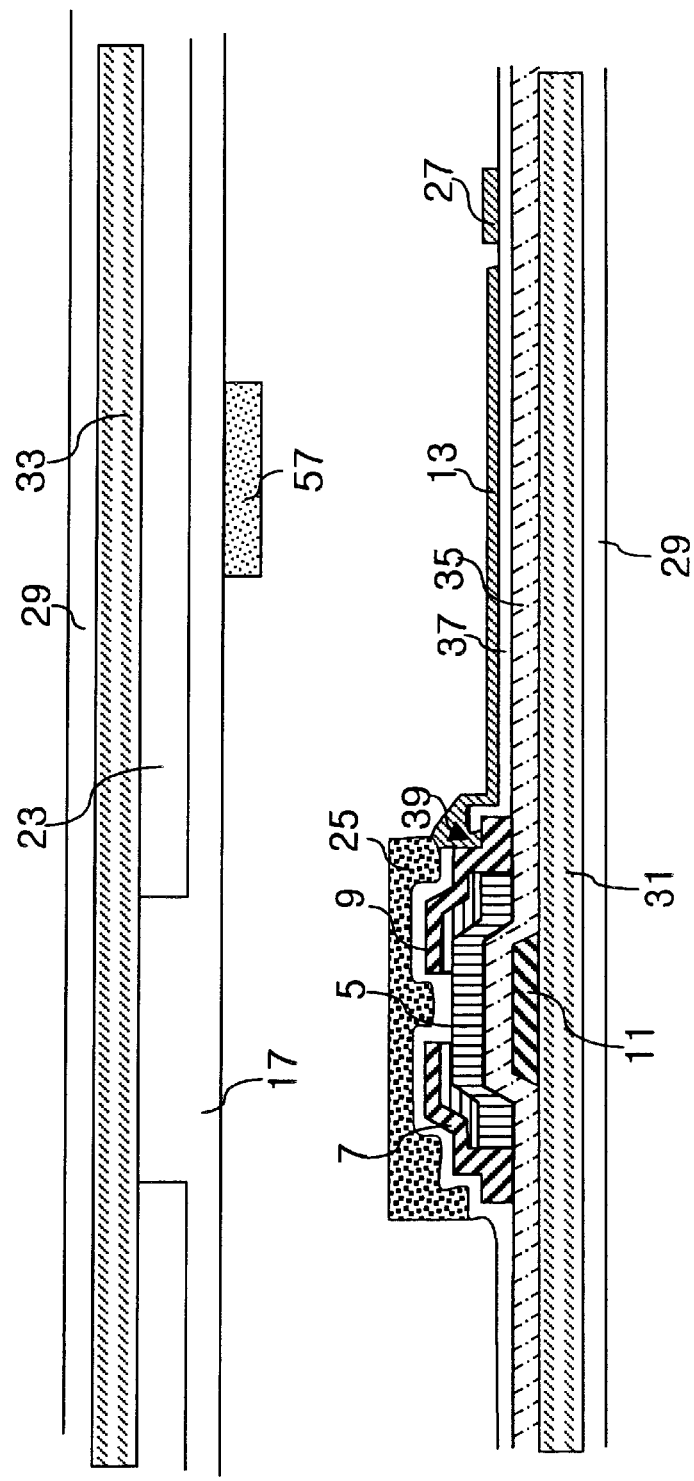
Figure 5E:
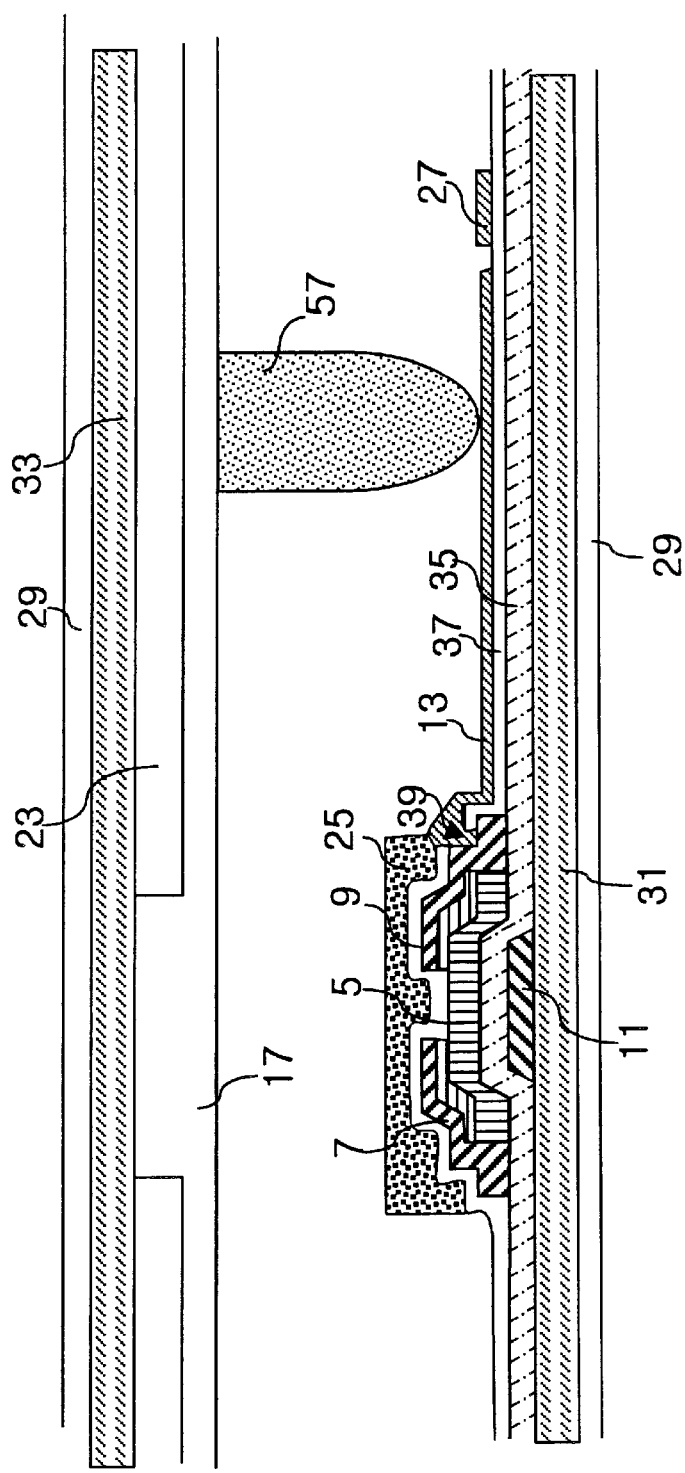
Figure 5F:
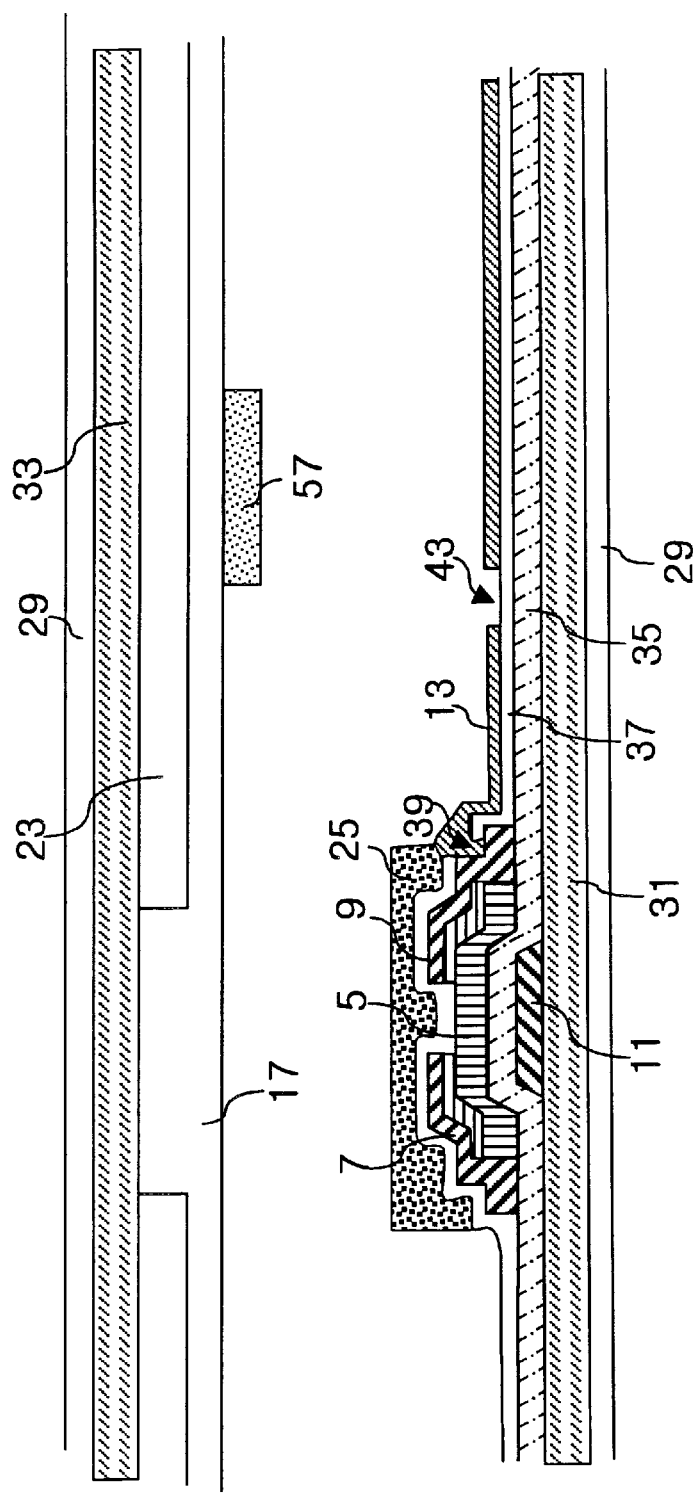
Figure 5G:
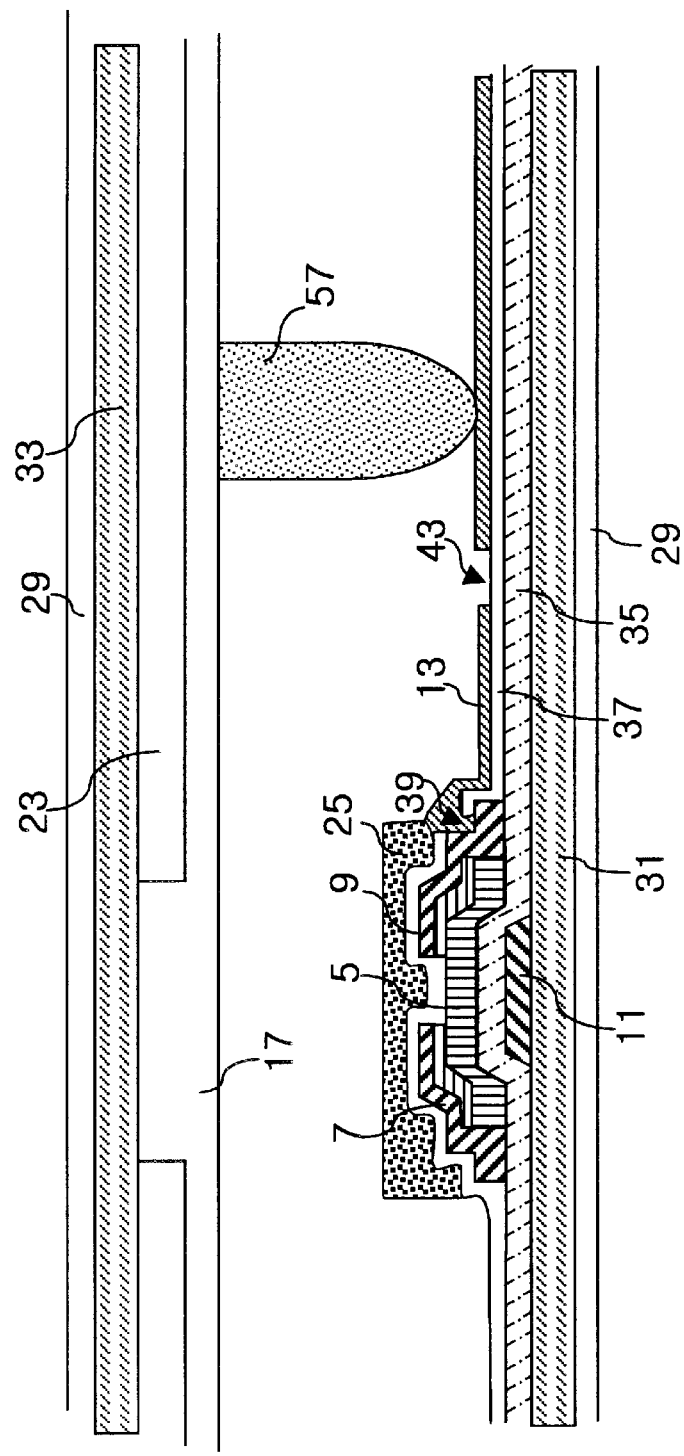
Figure 6C:
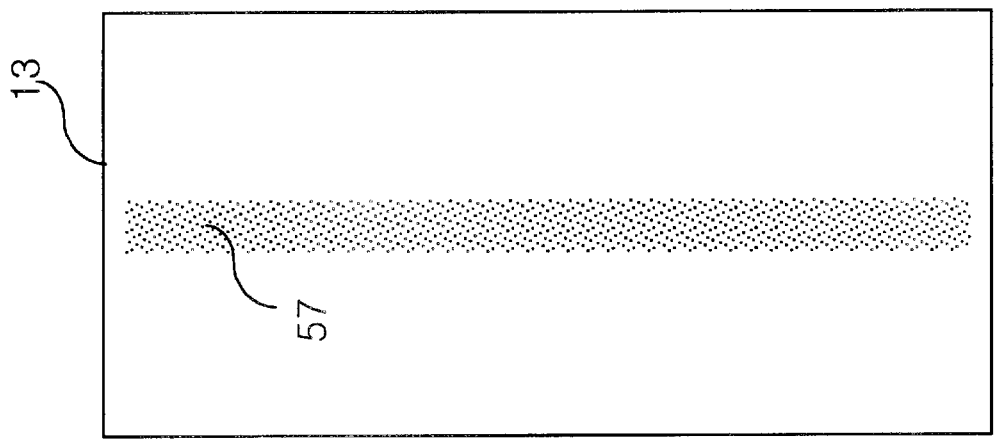
FIGS. 6A, 6B, 6C, 6D, 6E, 6F, and 6G are plan views of the multi-domain liquid crystal display devices according to embodiments of the present invention.
Figure 6B:
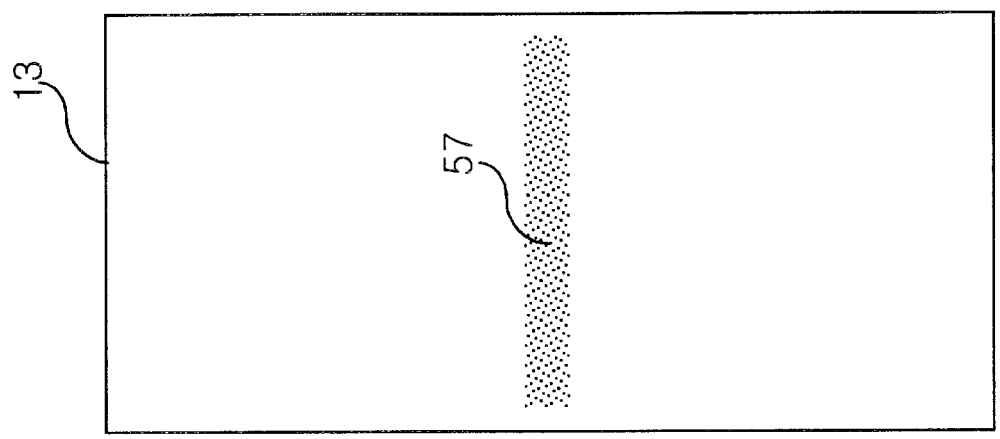
Figure 6A:
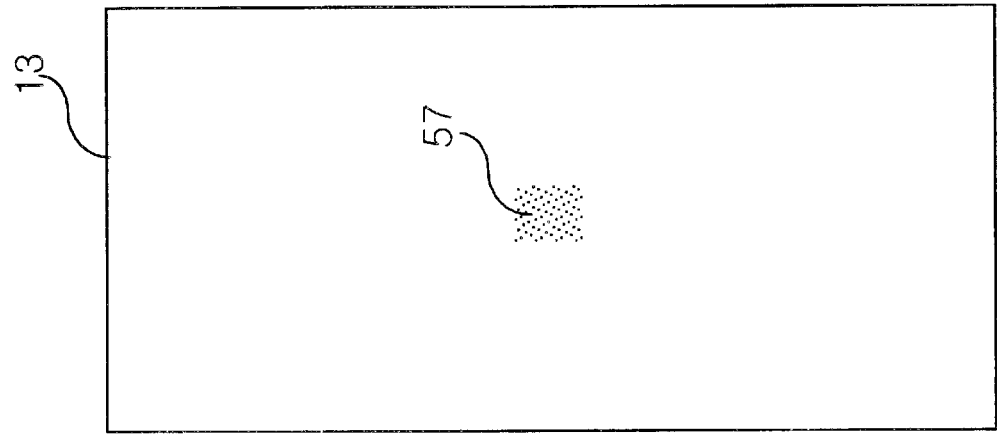
Figure 6E:
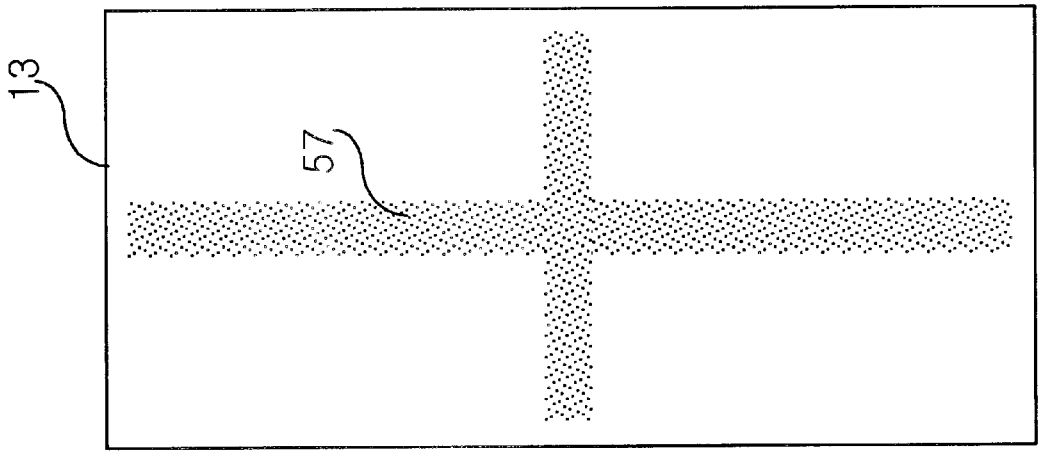
Figure 6D:
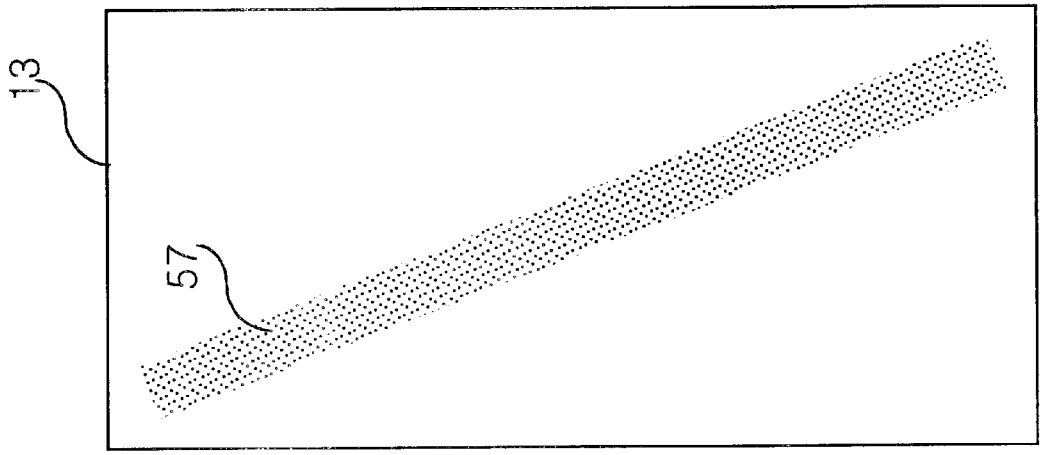
Figure 6F:
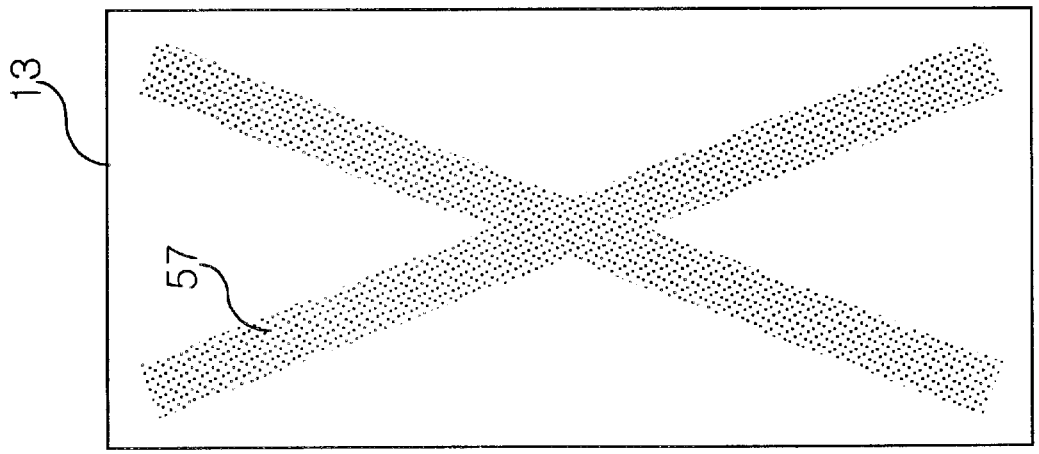
Figure 6G:
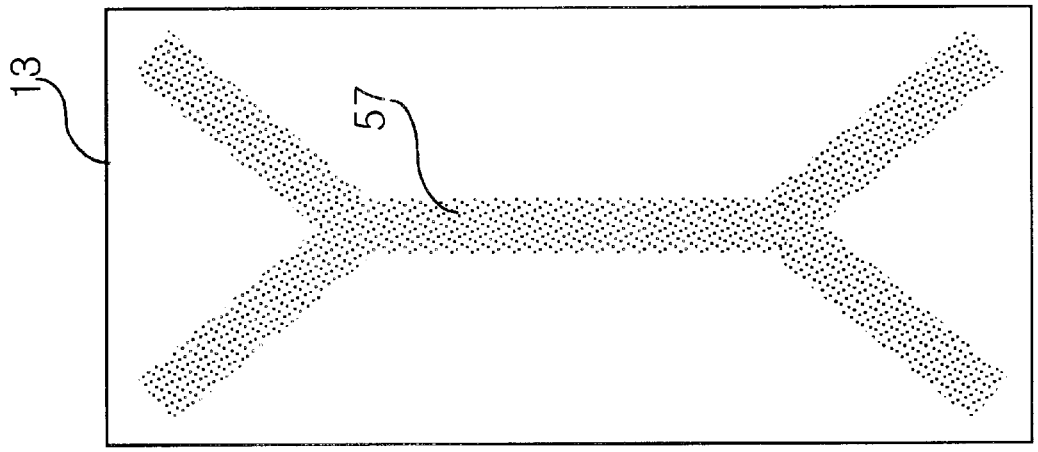
Figure 7A:
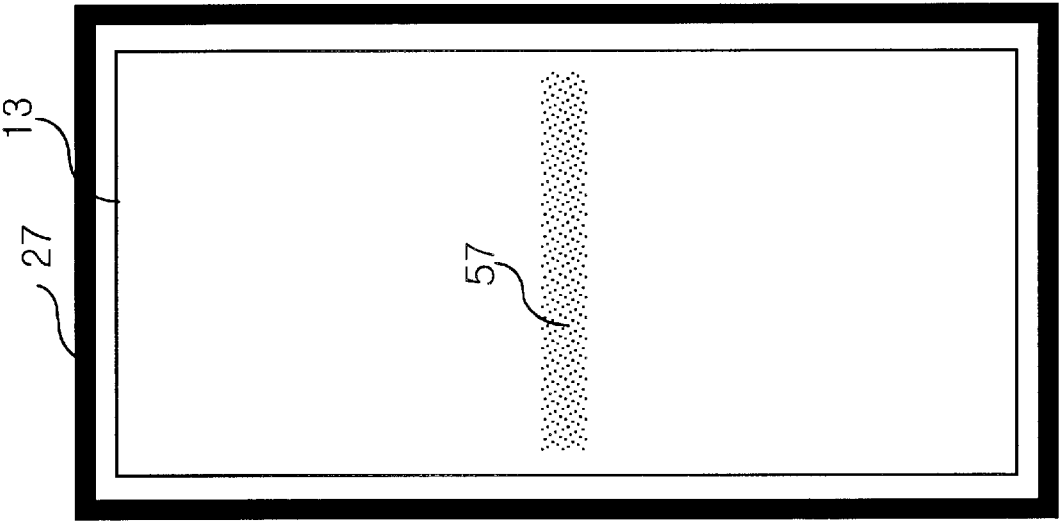
Figure 7B:
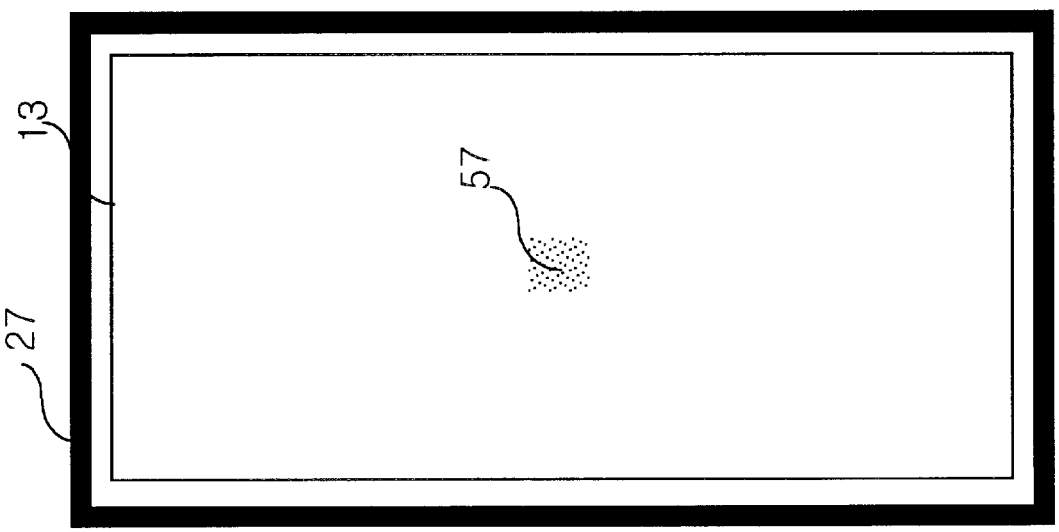
Figure 7E:
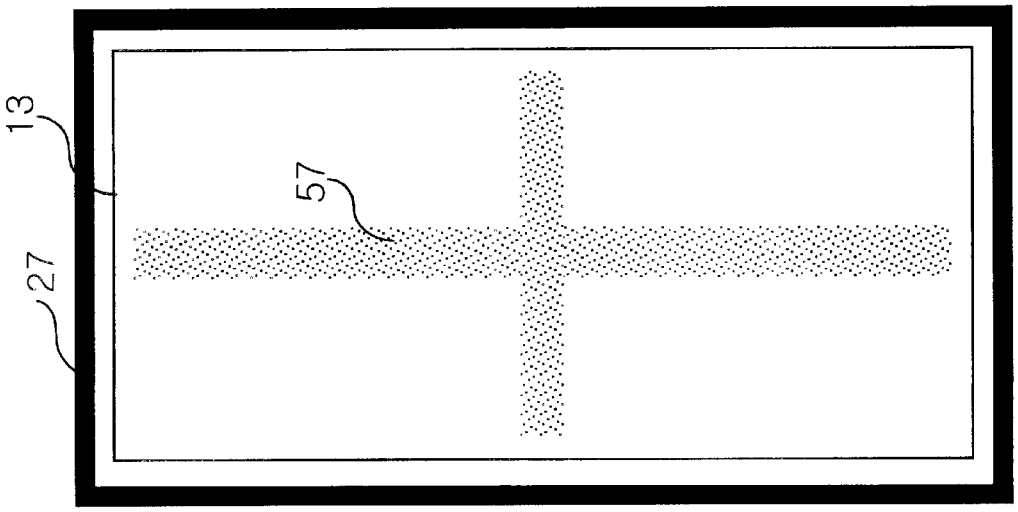
Figure 7F:
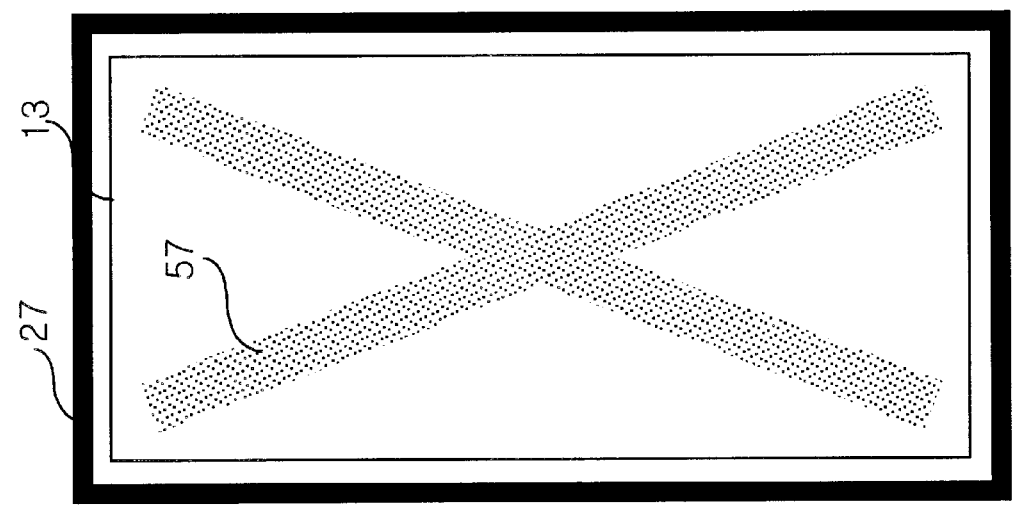
Figure 7G:
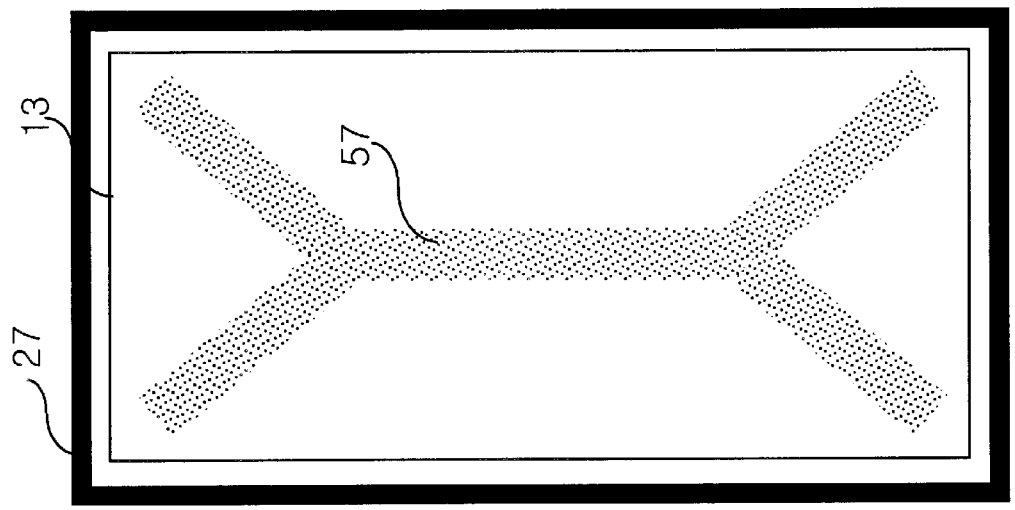
Figure 8A:
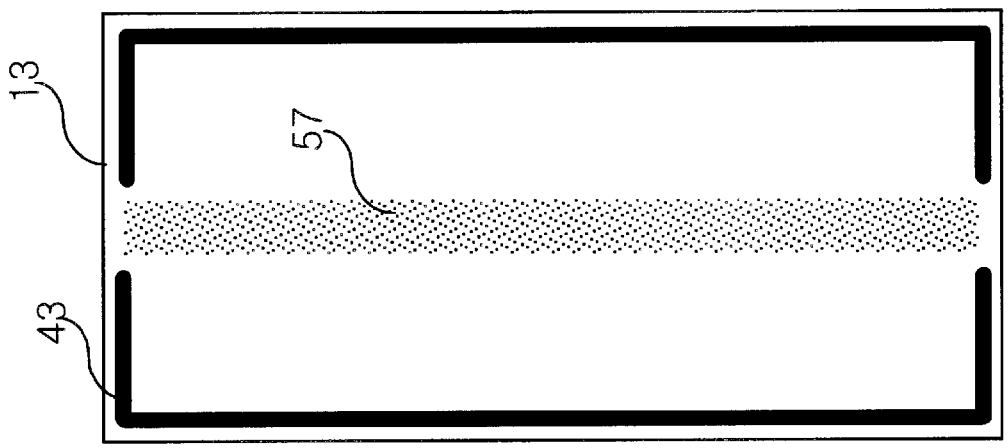
FIGS. 8A, 8B, 8C, 8D, 8E, 8F, 8G, 8H 8I, 8J, 8K, 8L, and 8M are plan views of the multi-domain liquid crystal display devices according to embodiments of the present invention.
Figure 8B:
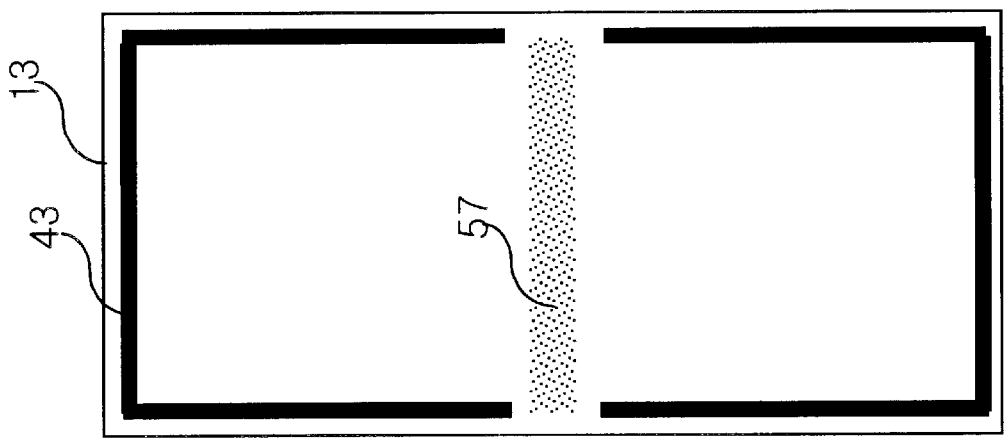
Figure 8C:
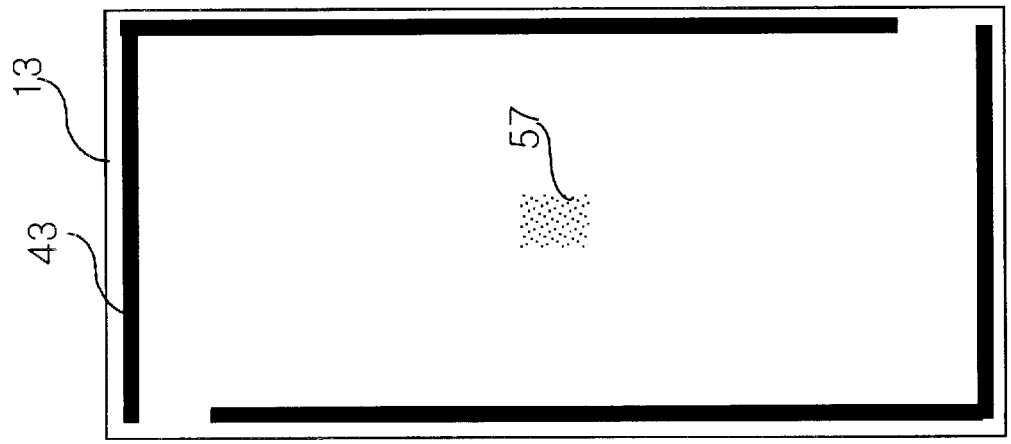
Figure 8F:
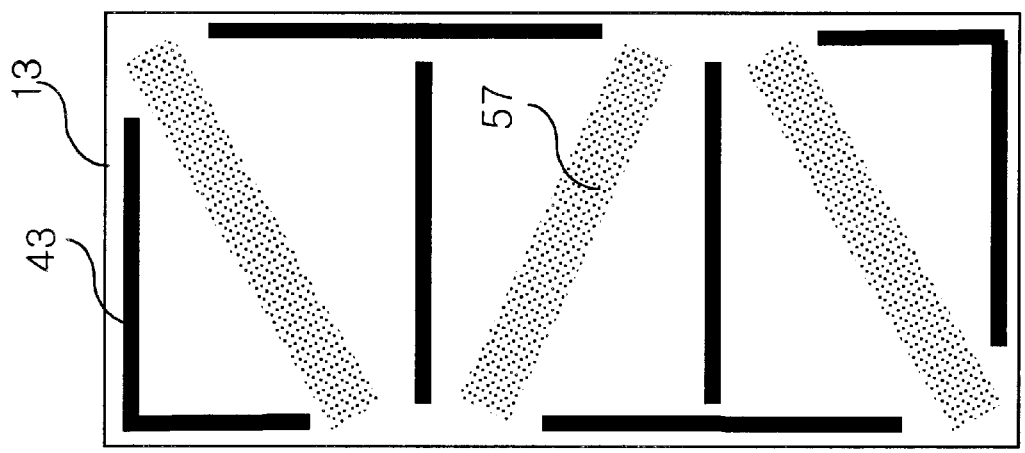
Figure 8E:
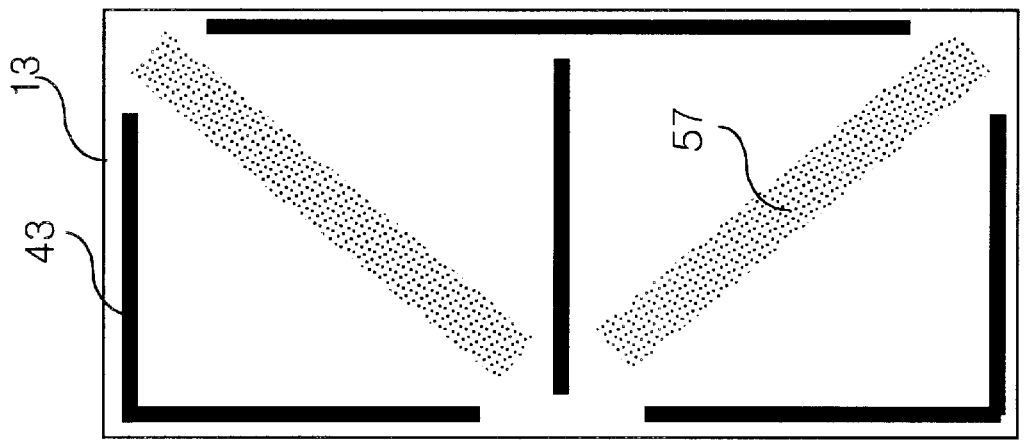
Figure 8D:
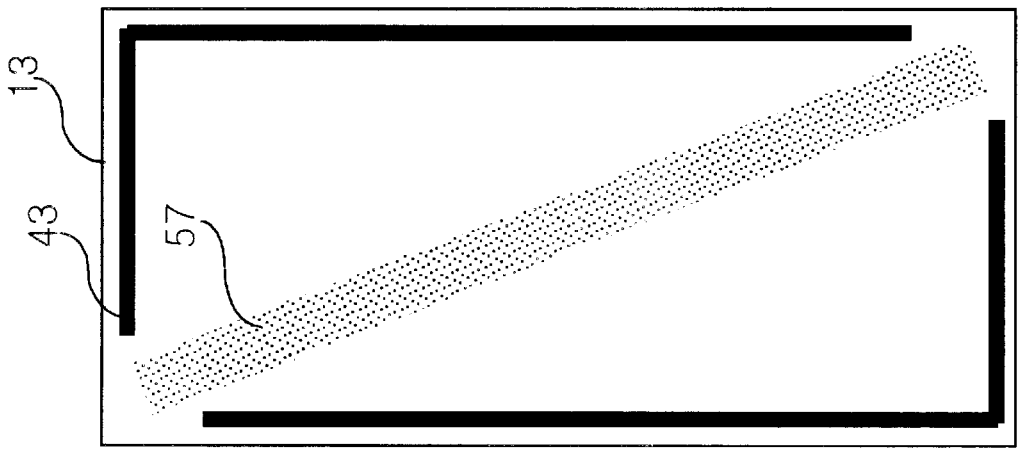
Figure 8I:
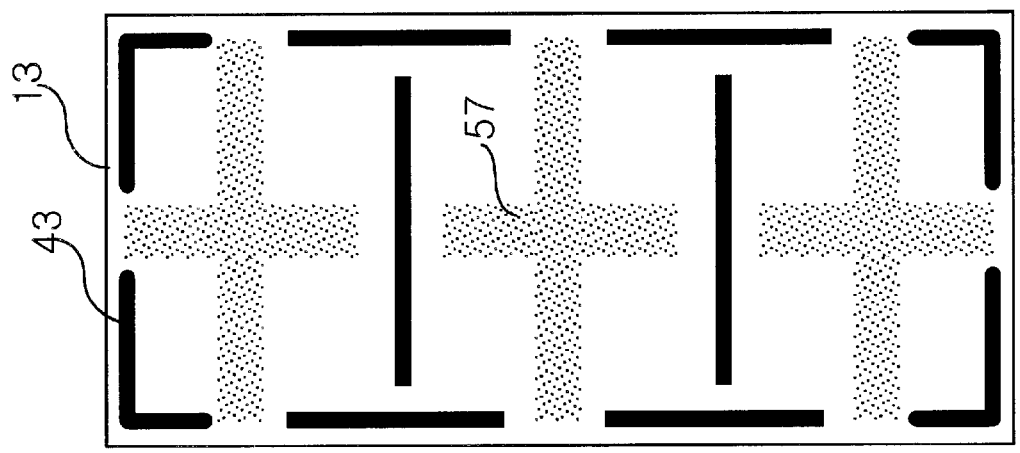
Figure 8H:
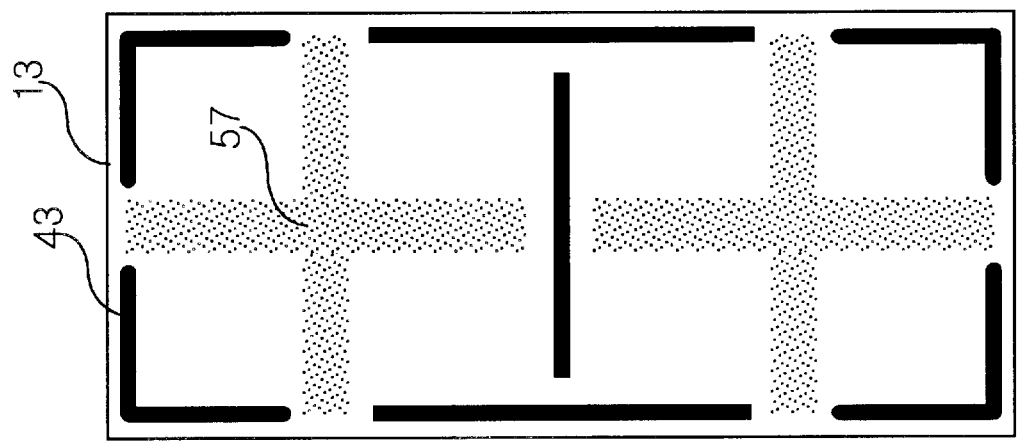
Figure 8G:
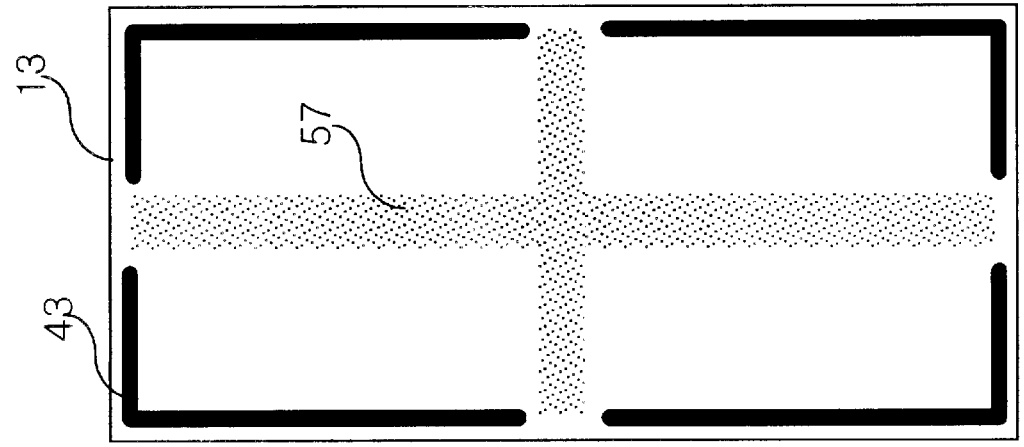
Figure 8L:
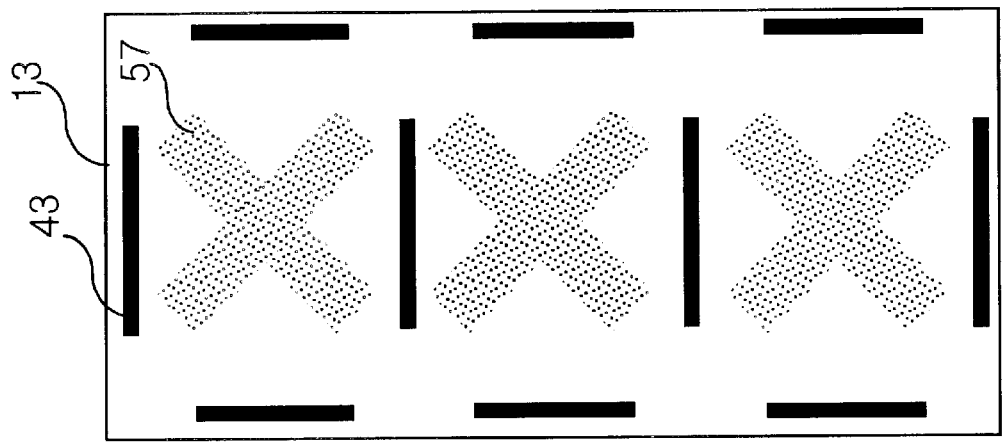
Figure 8K:
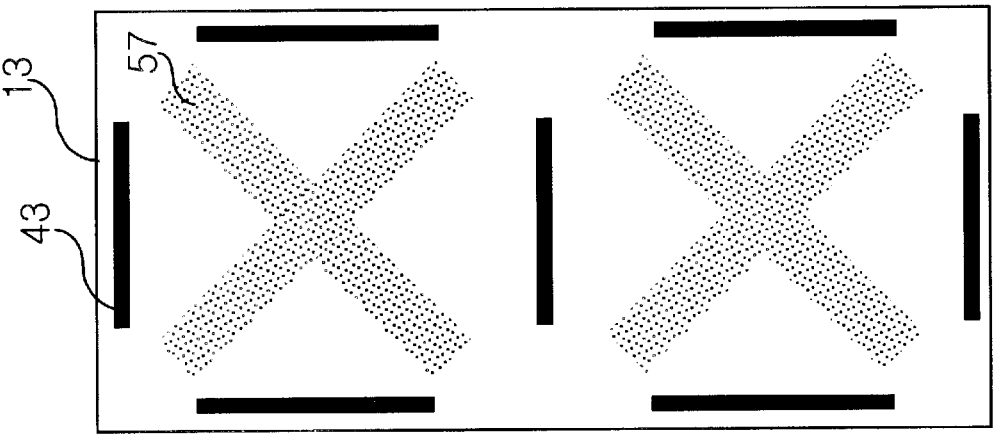
Figure 8J:
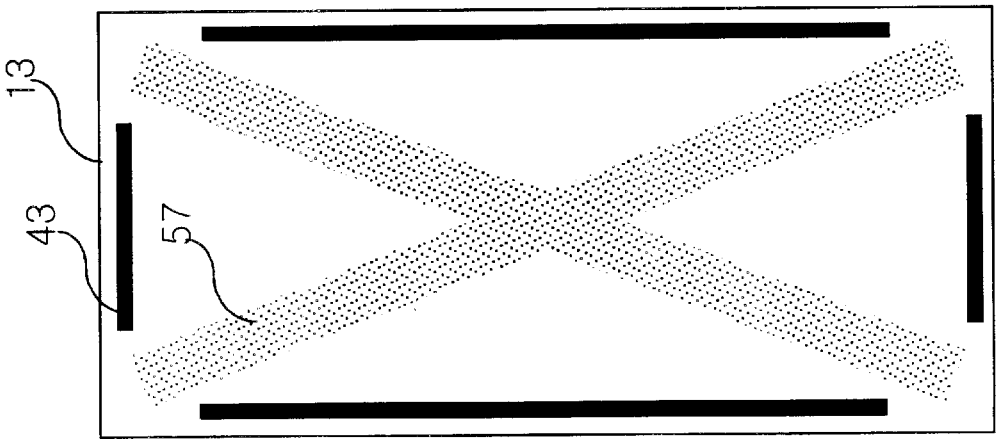
Figure 8M:
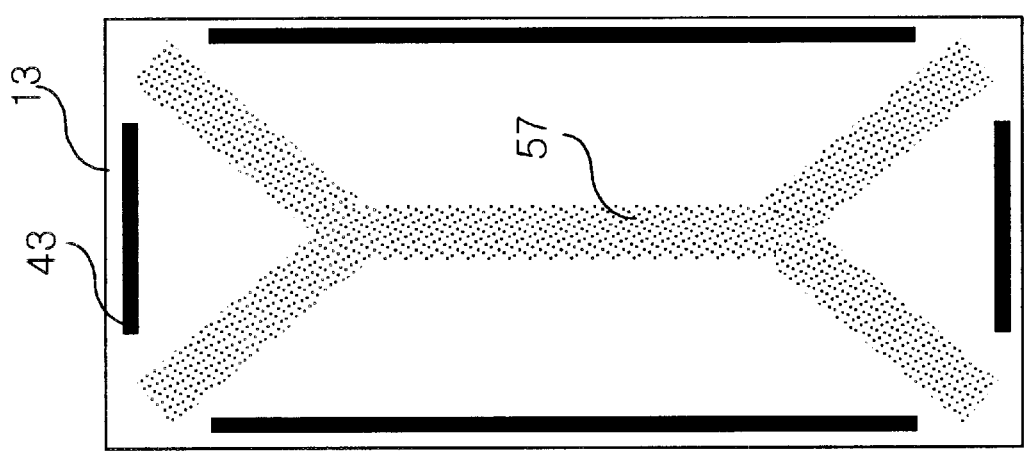

And, an electric field inducing window 43 is formed on at leas one substrate between the first and second substrates (refer to FIGS. 4B and 5F, 5G. At this time, the dielectric frame and electric field inducing window are formed on same substrate together. The electric field inducing window 43 is formed in various shapes by patterning hole or slit in the common electrode 17 or pixel electrode 13.

As an embodiment in multi-domain LCD of the present invention, an auxiliary electrode 27 is additionally formed in an area except the pixel region. (refer to FIGS. 3A and 5A) The auxiliary electrode 27 is formed on a layer whereon the pixel electrode 17 or gate electrode 11 is formed, and electrically connected to the common electrode 17. (refer to FIGS. 3B, 3C and 5D, 5E).

The auxiliary electrodes 27 is formed by sputtering and patterning a metal such as ITO(indium tin oxide), Al, Mo, Cr, Ta, Ti or Al alloy. At this time, it is possible to form the auxiliary and pixel electrodes 27, 13 by patterning the same metal once or by patterning different metals twice.

As shown in FIGS. 7, 9, 10, and 11, the auxiliary electrode 27 can be formed as surrounding the pixel electrode 13, in the side of data bus line and/or in the side of gate bus line.

FIG. 5 show that the light shielding layer 25 is formed on the firs t substrate 31, FIGS. 5D and 5E show that the auxiliary electrode 27 is formed on a layer whereon the pixel electrode 17 is formed in these embodiments, the light shielding layer formed to adjust exactly the pixel region, hence, the lamination margin is reduced and the aperture ratio is enhanced than the light shielding layer is formed on the second substrate.

On at least one substrate, a compensation film 29 is formed with polymer. The compensation film is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film 29, which has two optical axes and has wider viewing-angle characteristics as compared with the negative uniaxial film. The compensation film could be formed on both substrates or one of them.

After forming the compensation film 29, polarizer is formed on at least one substrate. At this time, the compensation film and polarizer are preferably composed as one.

In the FIGS. 6A to 6G, the dielectric frame 57 is patterned in various shapes, which obtains multi-domain effect.

In the FIGS. 7A to 7G, the auxiliary electrode 27 is formed surrounding pixel electrode 13, and the dielectric frame 57 is patterned in various shapes, which obtains multi-domain effect.

In the FIGS. 8A to 8M, the electric field inducing window 43 is formed, and the dielectric frame 57 is patterned in various shapes, which obtains multi-domain effect. The electric field inducing window 43 may be a slit or hole.

In the LCD in FIGS. 6 to 8, the liquid crystal layer includes liquid crystal molecules having negative dielectric anisotropy, which applies a homeotropic alignment where liquid crystal molecules in the Liquid crystal layer are aligned homeotropically to surfaces of the first and second substrates.

In the FIGS. 9A, 9B, 9C, and 9D, the auxiliary electrode 27 is formed, and the dielectric frame 57 is patterned in various shapes, which obtains multi-domain effect. Although not shown in the figures, there are embodiments that do not form the auxiliary electrode 27.

The solid lined-arrow 63 presents the rubbing direction of the second substrate 33 and the dotted lined-arrow 61 presents the rubbing direction of the first substrate 31

Figure 10A:
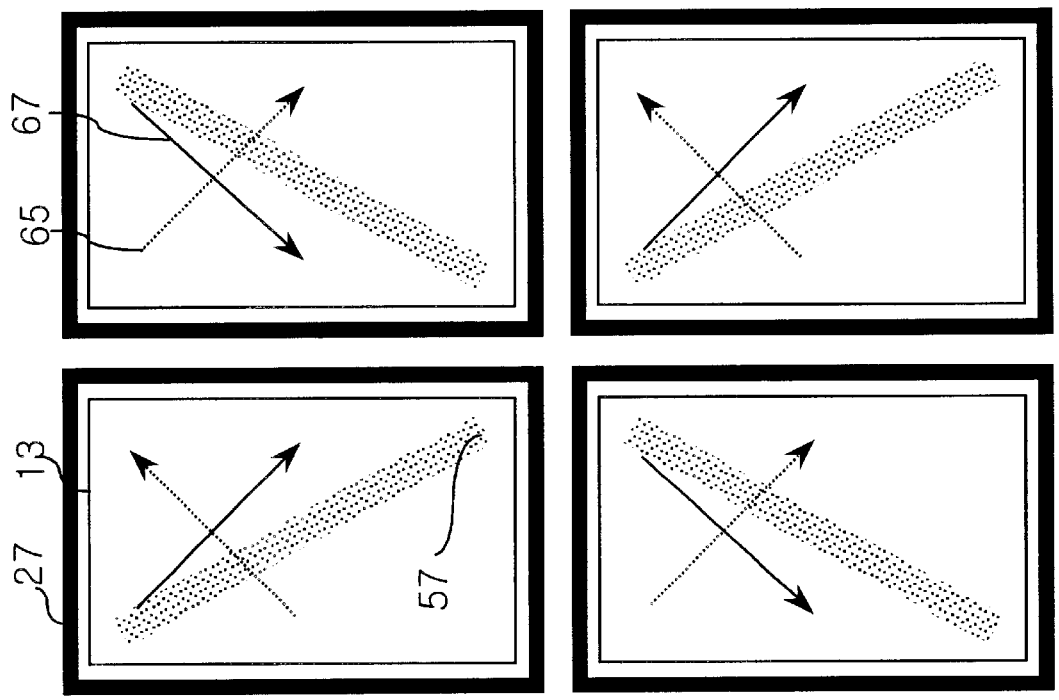
FIGS. 10A, 10B, and 10C are plan views of the multi-domain liquid crystal display devices according to embodiments of the present invention.
Figure 10C:
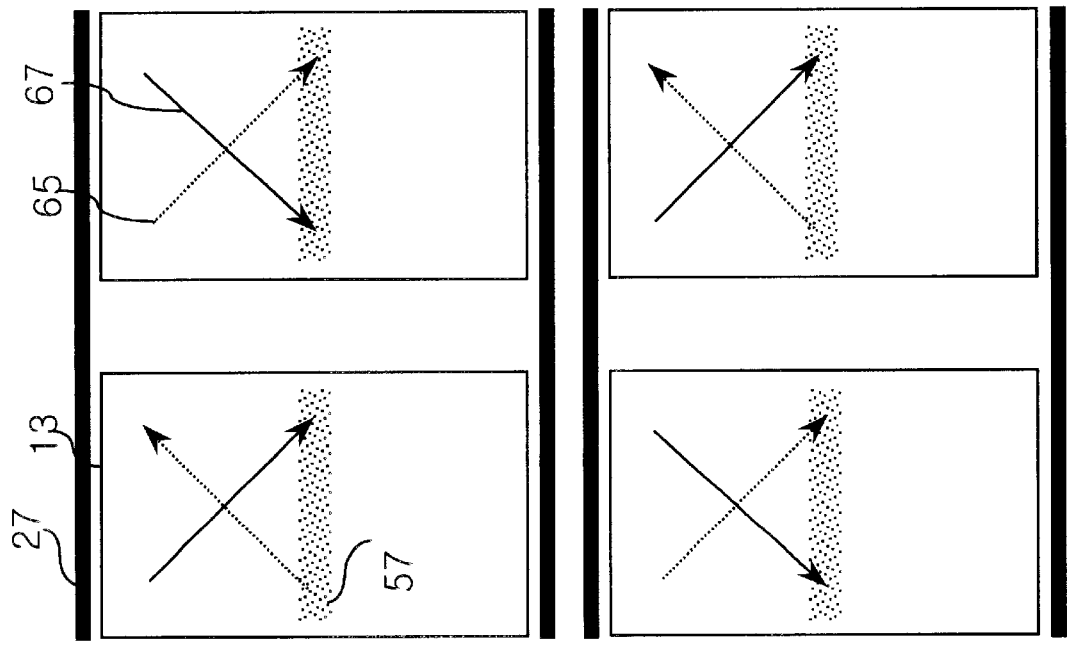
Figure 10B:
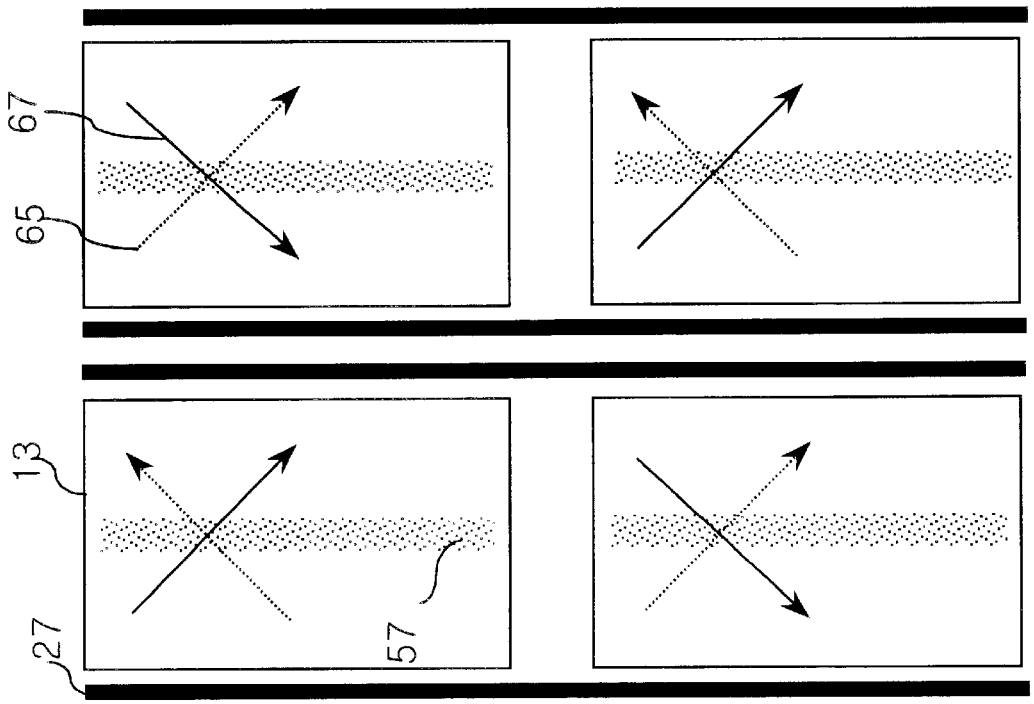

In the FIGS. 10A, 10B, and 10C, the auxiliary electrode 27 is formed, and the dielectric frame 57 is patterned in various shapes. Furthermore, neighboring two pixels and two alignment directions are associated, which obtains multi-domain effect. Although not shown in the figures, there are embodiments that do not form the auxiliary electrode 27

The solid lined-arrow 67 presents the alignment direction of the second substrate 33 and the dotted lined-arrow 65 presents the alignment direction of the first substrate 31.

Figure 11C:
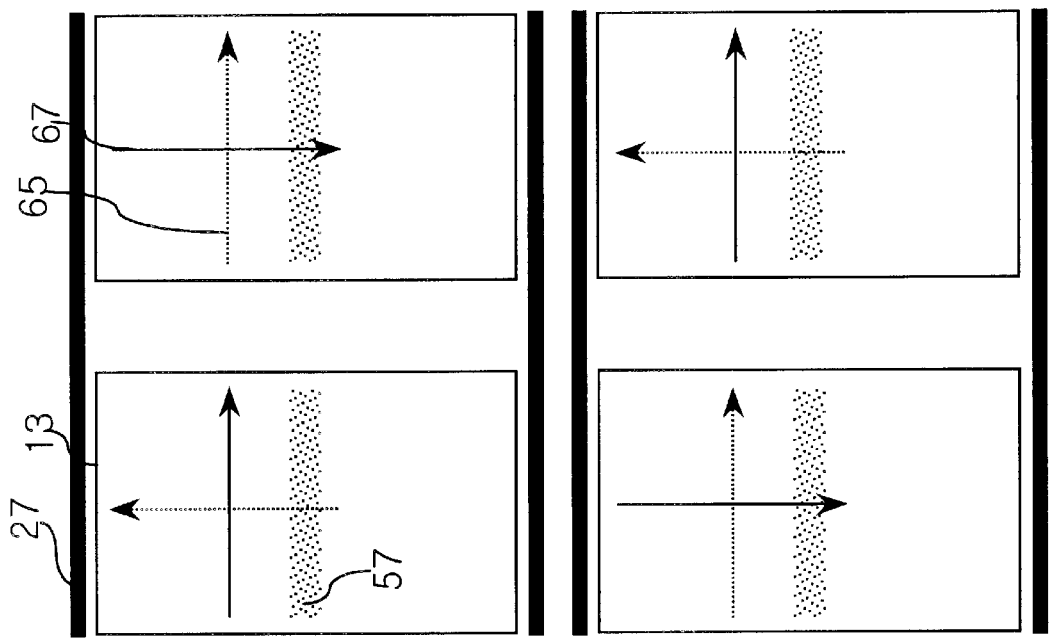
Figure 11B:
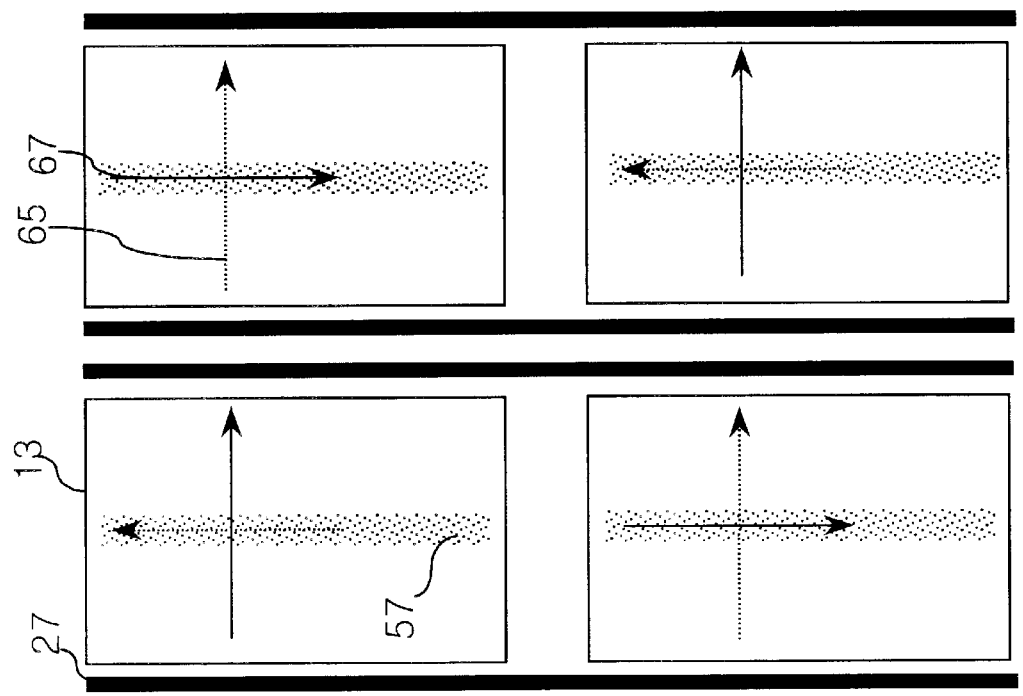

In the FIGS. 11A, 11B, and 11C, the auxiliary electrode 27 is formed, and the dielectric frame 57 is patterned in various shapes. Furthermore neighboring two pixels and two alignment directions are associated being different from that in the FIG. 10, which obtains multi-domain effect. Although not shown in the figures, there are embodiments that do not form the auxiliary electrode 27.

In the LCD in FIGS. 9 to 11, the liquid crystal layer includes liquid crystal molecules having positive dielectric anisotropy, which applies a homogeneous alignment where liquid crystal molecules in the liquid crystal layer are aligned homogeneously to surfaces of the first and second substrates.

From forming the electric field inducing window or dielectric frame, the multi-domain is obtained by dividing each pixel into four domains such as in a "+""x", or "double Y" shape, or dividing each pixel horizontally, vertically, and/or diagonally, and differently alignment-treating or forming alignment directions on each domain and on each substrate.

Furthermore, in multi-domain LCD of the present invention, the first and second alignment layers 53, 55 are formed over the whole first and/or second substrates. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may he used. Irradiating light once on the alignment layer determines the alignment or pretilt direction and the pretilt angle. The light used in the photo-alignment is preferably a light in a range of ultraviolet light, and any of unpolarized light, linearly polarized light, and partially polarized light can be used.

In the rubbing or photo-alignment treatment, it is possible to apply one or both of the first and second substrates, and to apply different aligning-treatment on each substrate.

From the aligning-treatment, a multi-domain LCD is formed with at least two domains, and LC molecules of the LC lager are aligned differently one another en each domain. That is, the multi-domain is obtained by dividing each pixel into four domains such as in a "+" or "x" shape, or dividing each pixel horizontally, vertically, and/or diagonally, and differently alignment treating or forming alignment directions on each domain and on each substrate.

It is possible to have at least one domain of the divided domains unaligned. It is also possible to have all domains unaligned.

Consequently, the multi-domain LCD of the present invention forms dielectric frames of which dielectric constant is different from that of liquid crystal, and auxiliary electrode or electric field inducing window to distort electric field, thereby wide viewing angle is obtained.

Also, the dielectric frame is patterned as a spacer, which an leave out the spacer process in the conventional LCD process.

Furthermore, in the case of conducting an alignment-treatment, a high response time and a stable LC Structure can be obtained by a pretilt angle and an anchoring energy. It will be apparent to those skilled in the, art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode electrically charged through said data bus line in said pixel region;

a color filter layer on said second substrate;

a common electrode on said color filter layer;

dielectric frames in said pixel region;

an auxiliary electrode in an area except said pixel region; and an alignment layer on at least one substrate between said first and second substrates.

2. The multi-domain liquid crystal display device according to claim 1, wherein said dielectric frame is patterned.

3. The multi-domain liquid crystal display device according to claim 1, wherein dielectric constant of said dielectric frame is lower than dielectric constant of said liquid crystal layer.

4. The multi-domain liquid crystal display device according to claim 1, wherein said dielectric frame includes photosensitive materials.

5. The multi-domain liquid crystal display device according to claim 1, wherein said dielectric frame includes a material selected from the group consisting of photoacrylate and BCB (BenzoCycloButene).

6. The multi-domain liquid crystal display device according to claim 1, wherein said auxiliary electrodes is on a layer that said pixel electrode is formed on.

7. The multi-domain liquid crystal display device according to claim 1, wherein said auxiliary electrode is on a layer that said gate bus lines are formed on.

8. The multi-domain liquid crystal display device according to claim 1, wherein said auxiliary electrode is electrically connected to said common electrode.

9. The multi-domain liquid crystal display device according to claim 1, wherein said auxiliary electrode includes a material selected from the group consisting of ITO (indium tin oxide), aluminum, molybdenum, chromium, tantalum, titanium, and an alloy thereof.

10. The multi-domain liquid crystal display device according to claim 1, wherein said common electrode has an electric field inducing window inside of itself.

11. The multi-domain liquid crystal display device according to claim 10, wherein said common electrode is patterned.

12. The multi-domain liquid crystal display device according to claim 1, wherein said common electrode includes ITO (indium tin oxide).

13. The multi-domain liquid crystal display device according to claim 1, wherein said pixel electrode has an electric field inducing window inside of itself.

14. The multi-domain liquid crystal display device according to claim 13, wherein said pixel electrode is patterned.

15. The multi-domain liquid crystal display device according to claim 1, wherein said pixel electrode includes a material selected from the group consisting of ITO (indium tin oxide), aluminum, and chromium.

16. The multi-domain liquid crystal display device according to claim 1, further comprising;

an over coat layer on said color filter layer.

17. The multi-domain liquid crystal display device according to claim 1, wherein said pixel region is divided into at least two portions, liquid crystal molecules in said liquid crystal Layer in each portion being driven differently from each other.

18. The multi-domain liquid crystal display device according to claim 1, wherein said alignment layer is divided into at least two portions, liquid crystal molecules in said liquid crystal layer in each portion being aligned differently from each other.

19. The multi-domain liquid crystal display device according to claim 18, wherein at least one portion of said alignment layer is alignment-treated.

20. The multi-domain liquid crystal display device according to claim 18, wherein all portions of said alignment layer are non-alignment-treated.

21. The multi-domain liquid crystal display device according to claim 18, wherein at least one portion of said alignment layer is rubbing-treated.

22. The multi-domain liquid crystal display device according to claim 21, wherein said alignment layer includes a material selected from the group consisting of polyimide and polyamide based materials, PVA (polyvinylalcohol), polyamic acid, and silicon dioxide.

23. The multi-domain liquid crystal display device according to claim 18, wherein at least one portion of said alignment layer is photo-alignment-treated.

24. The multi-domain liquid crystal display device according to claim 23, wherein said alignment layer includes a material selected from the group consisting of PVCN (polyvinylcinnamate), PSCN (polysiloxanecinnamate), and CelCN (cellulosecinnnamate)based materials.

25. The multi-domain liquid crystal display device according to claim 23, wherein said alignment layer is photo-aligned by ultraviolet light.

26. The multi-domain liquid crystal display device according to claim 23, wherein said alignment layer is photo-aligned by irradiating light at least one time.

27. The multi-domain liquid crystal display device according to claim 1, wherein said liquid crystal layer includes liquid crystal molecules having positive dielectric anisotropy.

28. The multi-domain liquid crystal display device according to claim 1, wherein said liquid crystal layer includes liquid crystal molecules having negative dielectric anisotropy.

29. The multi-domain liquid crystal display device according to claim 1, wherein said dielectric frame is a spacer.

30. The multi-domain liquid crystal display device according to claim 1, further comprising:

a negative uniaxial film on at least one substrate between said first and second substrates.

31. The multi-domain liquid crystal display device according to claim 1, further comprising:

a negative biaxial film on at least one substrate between said first and second substrates.

32. The multi-domain liquid crystal display device according to claim 1, further comprising:

a light shielding layer on said first substrate.

33. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode electrically charged through said data bus line in said pixel region;

a light shielding layer in an area except said pixel region on said first substrate;

a color filter layer on said second substrate;

a common electrode on said color filter layer;

dielectric frames in said pixel region; and an alignment layer on at least one substrate between said first and second substrates.

34. The multi-domain liquid crystal display device according to claim 33, further comprising:

an auxiliary electrode in an area except said pixel region.

35. The multi-domain liquid crystal display device according to claim 33, wherein said common electrode has an electric field inducing window inside of itself.

36. The multi-domain liquid crystal display device according to claim 33, wherein said pixel electrode has an electric field inducing window inside of itself.

37. The multi-domain liquid crystal display device according to claim 33, wherein said dielectric frame is a spacer.

38. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode electrically charged through said data bus line in said pixel region;

a color filter layer on said second substrate;

a common electrode on said color filter layer;

dielectric frames in said pixel region;

an electric field inducing window in said pixel region; and an alignment layer on at least one substrate between said first and second substrates.

39. The multi-domain liquid crystal display device according to claim 38, further comprising:

an auxiliary electrode in an area except said pixel region.

40. The multi-domain liquid crystal display device according to claim 38, wherein said dielectric frame is a spacer.

41. The multi-domain liquid crystal display device according to claim 38, further comprising:

a light shielding layer in an area except said pixel region on said first substrate.

42. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode electrically charged through said data bus line in said pixel region;

a color filter layer on said second substrate;

a common electrode on said color filter layer;

dielectric frames in said pixel region as a spacer; and an alignment layer on at least one substrate between said first and second substrates.

43. The multi-domain liquid crystal display device according to claim 42, wherein said common electrode has an electric field inducing window inside of itself.

44. The multi-domain liquid crystal display device according to claim 42, wherein said pixel electrode has an electric field inducing window inside of itself.

45. The multi-domain liquid crystal display device according to claim 42, further comprising:

an auxiliary electrode in an area except said pixel region.

46. The multi-domain liquid crystal display device according to claim 42, further comprising:

a light shielding layer in an area except said pixel region on said first substrate.

47. A multi-domain liquid crystal display device comprising:

a plurality of data bus lines in which data signal is provided;

plurality of gate bus lines crossed said data bus lines to define a pixel region;

a pixel electrode driving a liquid crystal layer;

dielectric frames in said pixel region; and a light shielding layer in an area except said pixel region.

48. The multi-domain liquid crystal display device according to claim 47, further comprising:

an auxiliary electrode in an area except said pixel region.

49. The multi-domain liquid crystal display device according to claim 47, further comprising:

an electric field inducing window in said pixel region.

* * * * *